United States Patent
Park et al.

(10) Patent No.: US 11,755,705 B2
(45) Date of Patent: Sep. 12, 2023

(54) STORAGE DEVICE WITH CONCURRENT INITIALIZATION AND FINGERPRINT RECOGNITION

(71) Applicant: SAMSUNG ELECTRONICS CO., LTD., Suwon-si (KR)

(72) Inventors: Youngjin Park, Incheon (KR); Ilgyu Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 275 days.

(21) Appl. No.: 16/896,544

(22) Filed: Jun. 9, 2020

(65) Prior Publication Data

US 2021/0081518 A1 Mar. 18, 2021

(30) Foreign Application Priority Data

Sep. 17, 2019 (KR) .................. 10-2019-0113855

(51) Int. Cl.
  *G06F 21/32* (2013.01)
  *G06F 3/06* (2006.01)
  *G06V 40/50* (2022.01)
  *G06V 40/13* (2022.01)
  (Continued)

(52) U.S. Cl.
  CPC ............ *G06F 21/32* (2013.01); *G06F 3/0622* (2013.01); *G06F 3/0634* (2013.01); *G06F 3/0637* (2013.01); *G06F 3/0679* (2013.01); *G06V 10/98* (2022.01); *G06V 40/13* (2022.01); *G06V 40/1306* (2022.01); *G06V 40/1365* (2022.01); *G06V 40/50* (2022.01); *G06V 40/53* (2022.01)

(58) Field of Classification Search
  CPC ...... G06F 21/32; G06F 3/0622; G06F 3/0634; G06F 3/0637; G06F 3/0679; G06F 21/78; G06F 3/0607; G06F 3/062; G06F 3/0611; G06F 3/0632; G06F 3/0652; G06F 3/0688; G06F 12/14; G06V 40/1306; G06V 40/1365; G06V 40/50; G06V 10/98; G06V 40/53; G06V 40/13
  See application file for complete search history.

(56) References Cited

U.S. PATENT DOCUMENTS 7,669,047 B2  2/2010  Chou et al.
8,000,502 B2  8/2011  Dave et al.
(Continued)

FOREIGN PATENT DOCUMENTS

CA   2710627 A1 * 7/2009 ............ H04W 8/205
JP   2007-0249485      9/2007
(Continued)

*Primary Examiner* — Zhuo H Li
(74) *Attorney, Agent, or Firm* — F. Chau & Associates, LLC

(57) ABSTRACT

A method is provided for operating a storage device having biometric security protection, including: simultaneously starting both a device initialization operation and a biometric recognition operation; and if the device initialization operation has completed and the biometric recognition operation has successfully completed, setting the storage device to a normal access mode permitting external access to the storage device in accordance with the biometric security protection, wherein the device initialization operation and the biometric recognition operation are performed concurrently.

20 Claims, 23 Drawing Sheets

(51) Int. Cl.
    *G06V 40/12*        (2022.01)
    *G06V 10/98*        (2022.01)

(56)            References Cited

U.S. PATENT DOCUMENTS 8,250,387 B2 *  8/2012  Tsukamoto ............. G06F 21/81
                                                         713/340
     8,823,497 B2 *  9/2014  Hutzler .................. G06V 40/70
                                                         235/382
     9,003,175 B2    4/2015  Mese et al.
     9,177,151 B2   11/2015  Saito
     9,569,371 B2    2/2017  Cho et al.
  2003/0112120 A1 *  6/2003  K. ........................... G06F 21/34
                                                         340/5.53
  2006/0129838 A1 *  6/2006  Chen ....................... G06F 21/34
                                                         713/186
  2008/0209547 A1 *  8/2008  Funahashi ............... G06F 21/78
                                                         726/20
  2009/0267743 A1 * 10/2009  Faroe ....................... H04Q 9/00
                                                         340/10.1
  2015/0227377 A1 *  8/2015  Park ....................... G06F 9/4418
                                                         713/2
  2016/0154967 A1    6/2016  Lee et al.
  2018/0232509 A1 *  8/2018  Park ........................ G06F 21/79

FOREIGN PATENT DOCUMENTS

KR       10-0959275         5/2010
  KR       10-0966236         6/2010
  KR    10-2011-0023685       3/2011
  KR    10-2018-0094205       8/2018

* cited by examiner

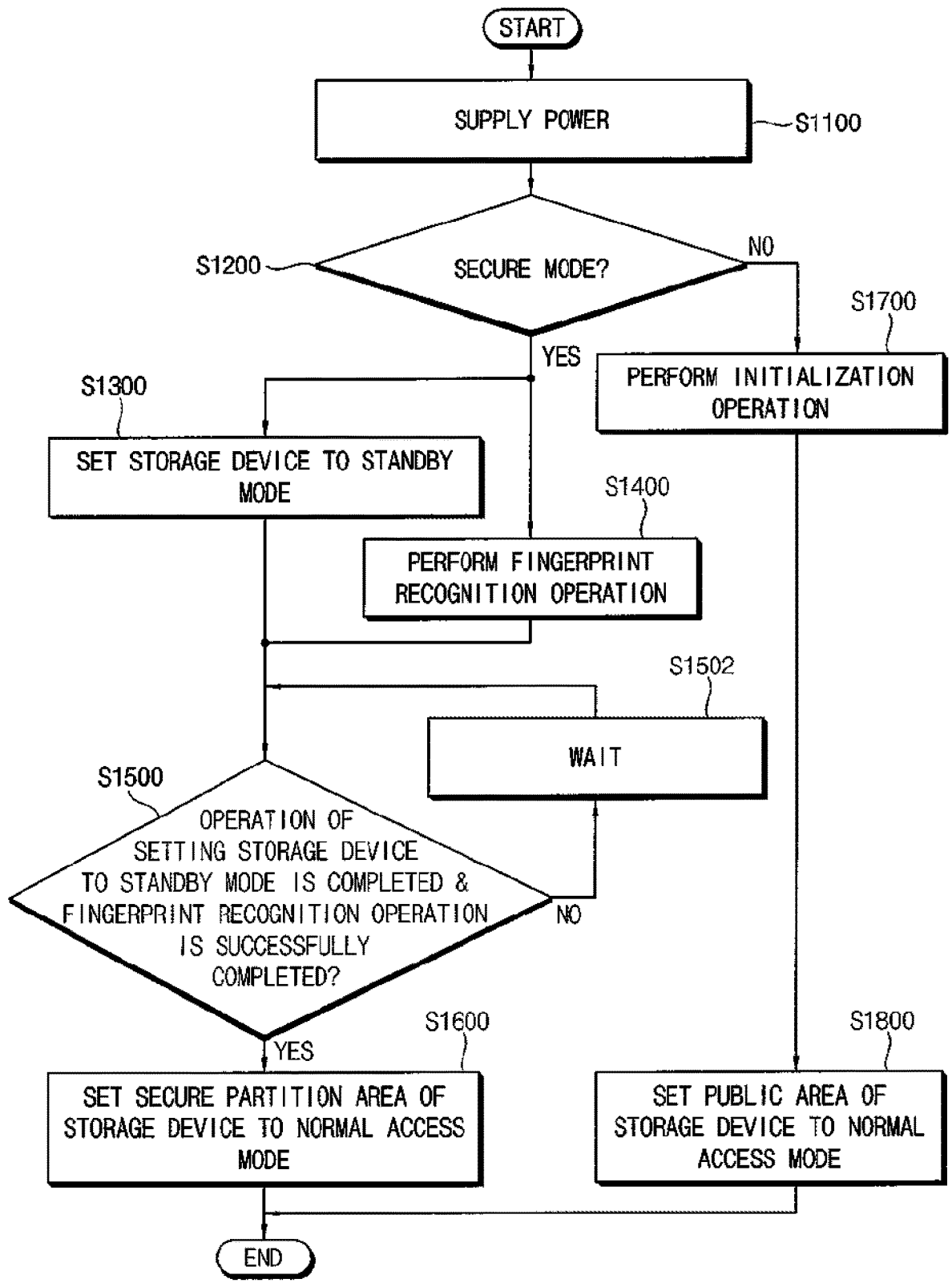

STORAGE DEVICE WITH CONCURRENT INITIALIZATION AND FINGERPRINT RECOGNITION

CROSS-REFERENCE TO RELATED APPLICATION

This application claims priority under 35 USC § 119 to Korean Patent Application No. 10-2019-0113855, filed on Sep. 17, 2019 in the Korean Intellectual Property Office (KIPO), the contents of which are herein incorporated by reference in their entirety.

TECHNICAL FIELD

Exemplary embodiments relate generally to semiconductor integrated circuits, and more particularly to methods of operating storage devices including fingerprint sensors, and storage devices performing the methods.

DISCUSSION OF RELATED ART

Certain types of data storage devices include one or more semiconductor memory devices. Examples of such data storage devices include solid state drives (SSDs). These types of data storage devices may enjoy various design and/or performance advantages over hard disk drives (HDDs), for example. Examples of potential advantages include the absence of moving mechanical parts, higher data access speeds, stability, durability, and/or lower power consumption.

A storage system typically includes a storage device and a host device controlling the storage device. In the storage system, the host device and the storage device are connected to each other through various interface standards, such as universal flash storage (UFS), serial advanced technology attachment (SATA), small computer system interface (SCSI), serial attached SCSI (SAS), embedded multi-media card (eMMC), or the like. As the operating speed of the host device is improved and the size of content used in the host device is increased, higher speed and larger capacity storage devices may be desired.

SUMMARY

At least one exemplary embodiment of the present disclosure provides a method of operating a storage device capable of improving and/or enhancing the security performance and the operating speed at the same time. At least one exemplary embodiment of the present disclosure provides a storage device that performs the method of operating the storage device.

According to an exemplary embodiment, a method of operating a storage device having biometric security protection includes: simultaneously starting both a device initialization operation and a biometric recognition operation; and if the device initialization operation has completed and the biometric recognition operation has successfully completed, setting the storage device to a normal access mode permitting external access to the storage device in accordance with the biometric security protection, wherein the device initialization operation and the biometric recognition operation are performed concurrently.

According to an exemplary embodiment, a storage device having biometric security protection includes: a plurality of nonvolatile memories; a storage controller configured to control operations of the plurality of nonvolatile memories; a power supply configured to supply power to the plurality of nonvolatile memories and the storage controller; and at least one biometric sensor configured to sense biometric indicia of a user, wherein, immediately after the power is supplied to the storage device, the storage controller is configured to set the storage device to a standby mode by starting an initialization operation on the storage device, wherein the storage controller is configured to perform a biometric recognition operation for recognizing the biometric indicia of the user by performing a biometric preparation operation using the at least one biometric sensor, wherein, when the initialization operation is completed and an operation of setting the storage device to the standby mode is completed, and when the biometric recognition operation is successfully completed, the storage controller is configured to set the storage device to a normal access mode such that an external host device is allowed to access the storage device in accordance with the biometric security protection, and wherein the initialization operation and the biometric preparation operation are concurrently performed, and the initialization operation is started before the biometric recognition operation is completed.

According to an exemplary embodiment, a method of operating a storage device having biometric security protection includes: supplying power to the storage device by electrically connecting the storage device with an external host device; immediately after power is supplied to the storage device, setting the storage device to a standby mode in which all or part of files stored in the storage device are not displayed by turning on and initializing a storage controller and a plurality of nonvolatile memories included in the storage device, by exchanging predetermined information with the external host device such that the storage device is recognized by the external host device, and by enabling a drive and a partition corresponding to the storage device; performing a fingerprint recognition preparation operation; performing a fingerprint recognition operation for recognizing a fingerprint of a user by comparing a fingerprint sensed by a fingerprint sensor with a registered fingerprint; when an operation of setting the storage device to the standby mode is completed, and when the fingerprint sensed by the fingerprint sensor matches the registered fingerprint and the fingerprint recognition operation is successfully completed, setting the storage device to a normal access mode such that the external host device is allowed to access the storage device in accordance with the biometric security protection; when the operation of setting the storage device to the standby mode is not completed, or when the fingerprint recognition operation is not successfully completed, waiting for a completion of the operation of setting the storage device to the standby mode and a successful completion of the fingerprint recognition operation; and when the fingerprint sensed by the fingerprint sensor does not match the registered fingerprint and the fingerprint recognition operation is unsuccessful, and when a number of times that the fingerprint recognition operation is unsuccessful exceeds a predetermined number of times, deleting a predetermined file among the files stored in the storage device, and wherein the operation of setting the storage device to the standby mode and the fingerprint recognition preparation operation are simultaneously or concurrently performed in parallel, and the operation of setting the storage device to the standby mode is started before the fingerprint recognition operation is completed.

In the method of operating the storage device and in the storage device according to exemplary embodiments, the biometric or fingerprint recognition operation and the device initialization operation need not be sequentially performed but may be substantially simultaneously started and concurrently performed in parallel. By simultaneously starting and concurrently performing the fingerprint recognition operation and the initialization operation, a procedure for using the storage device may be performed in advance even if the fingerprint of the user has not yet been input. After that, the storage device may be immediately accessible when the fingerprint of the user is recognized, and thus the driving speed of the storage device may be high.

BRIEF DESCRIPTION OF THE DRAWINGS

Illustrative, non-limiting exemplary embodiments are disclosed in the following detailed description. The detailed description will be more clearly understood when taken in conjunction with the accompanying drawings, in which:

FIG. 14 is a flowchart diagram illustrating a method of operating a storage device according to an exemplary embodiment;

DETAILED DESCRIPTION

Figure 1:
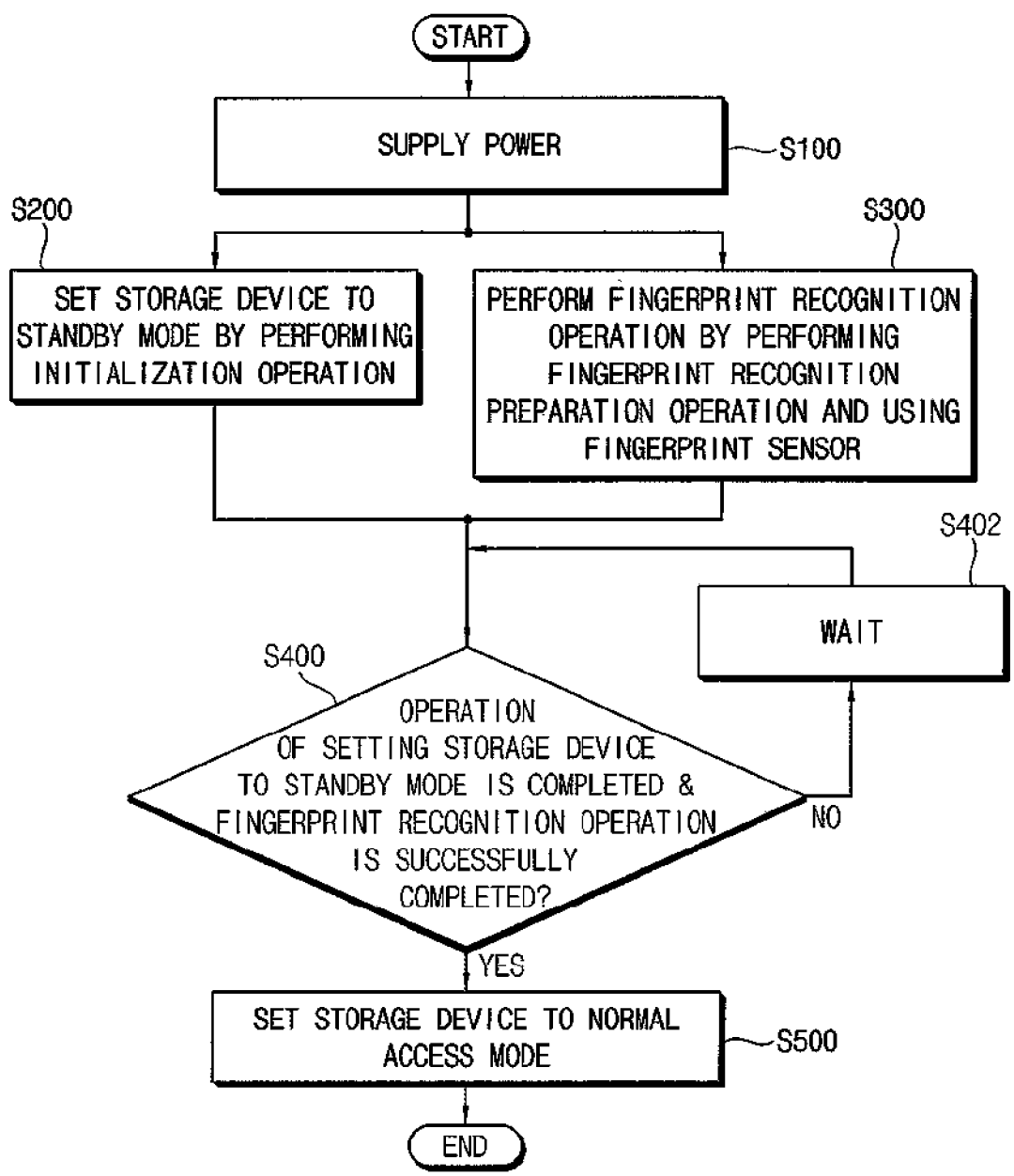
FIG. 1 is a flowchart diagram illustrating a method of operating a storage device according to an exemplary embodiment.

Exemplary embodiments will be described more fully with reference to the accompanying drawings. The present disclosure may, however, be embodied in many different forms and shall not be construed as limited to the exemplary embodiments set forth herein. Like reference numerals may refer to like elements throughout this application.

FIG. 1 illustrates a method of operating a storage device according to an exemplary embodiment of the present disclosure. Referring to FIG. 1, a storage device according to an exemplary embodiment includes a plurality of nonvolatile memories and a storage controller. The plurality of nonvolatile memories store data, and the storage controller controls operations of the plurality of nonvolatile memories. In addition, the storage device further includes a fingerprint sensor. Configurations of the storage device and a storage system including the storage device will be further described with reference to FIGS. 2 and 3.

In a method of operating the storage device according to the exemplary embodiment, power is supplied to the storage device at step S100. For example, the power may be supplied to the storage device by electrically connecting the storage device with an external host device. For example, the storage device and the external host device may be electrically and physically connected to each other through a cable such as a universal serial bus (USB) cable.

Immediately after the power is supplied to the storage device, the storage device is set to a standby mode by performing an initialization operation on the storage device at step S200. For example, the initialization operation may represent a procedure or preparation process required for driving the storage device. For example, unlike a normal access mode, which will be described in step S500, the standby mode may represent a mode in which the external host device recognizes the storage device but is not allowed to access the storage device. That is, the storage device is currently inaccessible Step S200 will be described with reference to FIG. 6.

A fingerprint recognition operation for recognizing a fingerprint of a user includes performing a fingerprint recognition preparation operation and using a fingerprint sensor at step S300. For example, the fingerprint recognition operation may be performed to identify, check or determine a legitimate user. Step S300 will be described with reference to FIG. 10.

The initialization operation in step S200 and the fingerprint recognition preparation operation in step S300 may be substantially simultaneously or concurrently performed. For example, the initialization operation and the fingerprint recognition preparation operation may be performed independently of each other. In addition, the initialization operation in step S200 may be started before the fingerprint recognition operation in step S300 is performed. Thus, as compared with a case where the initialization operation is performed after the fingerprint recognition operation is successfully completed, a driving speed of the storage device, such as the initial access speed, may be improved or enhanced.

When the initialization operation is completed and an operation of setting the storage device to the standby mode is completed, and when the fingerprint recognition operation is successfully completed, such as at step S400 with an outcome of YES, the storage device is set to a normal access mode such that the external host device is allowed to access the storage device at step S500. For example, files and/or data stored in the storage device may be displayed only after the storage device is set to the normal access mode.

When the operation of setting the storage device to the standby mode is not completed, or when the fingerprint recognition operation is not successfully completed, such as at step S400 with an outcome of NO, the method may wait for completion of the operation of setting the storage device to the standby mode and a successful completion of the fingerprint recognition operation at step S402. Steps S400, S402 and S500 will be described with reference to FIG. 12.

In the method of operating the storage device including the fingerprint sensor according to an exemplary embodiment, the fingerprint recognition operation and the initialization operation need not be sequentially performed but may be substantially simultaneously or concurrently performed. By simultaneously or concurrently performing the fingerprint recognition operation and the initialization operation, a procedure for using the storage device may be performed in advance even if the fingerprint of the user is not yet input. After that, the storage device may be immediately accessible when the fingerprint of the user is recognized, and thus a driving speed of the storage device, such as the initial access speed, may be improved or enhanced. For example, assuming that each of the fingerprint recognition operation and the initialization operation takes about 5 seconds, it may take about 10 seconds to access the storage device when the above-described two operations are sequentially performed. However, it may take about 5 seconds to access the storage device when the above-described two operations are simultaneously or concurrently performed in parallel according to this exemplary embodiment.

Figure 2:
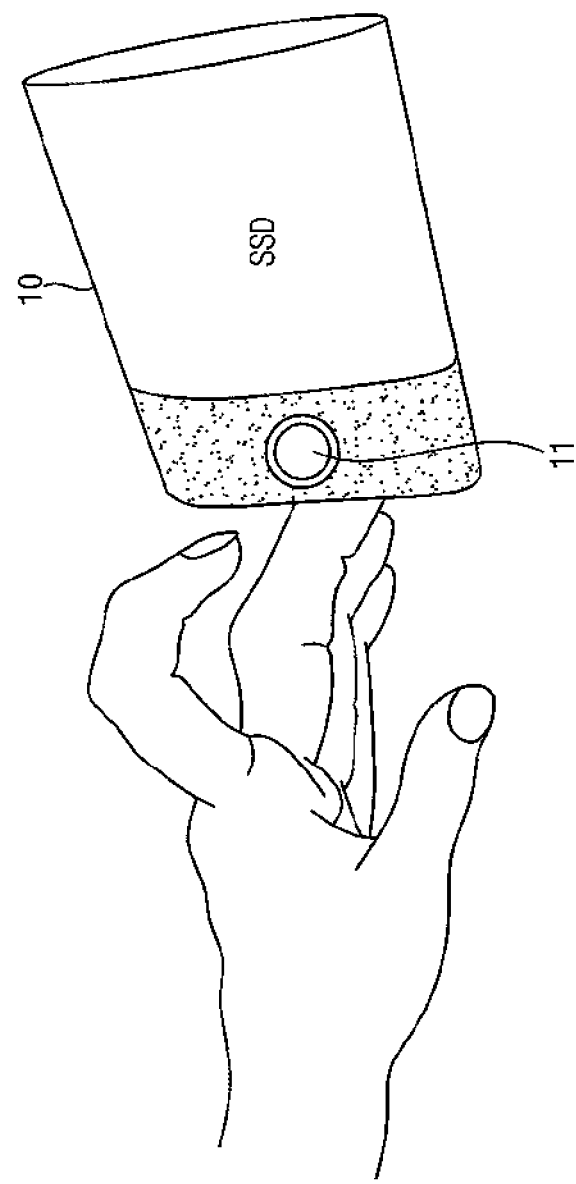
FIG. 2 is a conceptual diagram for conceptually describing a storage device according to an exemplary embodiment.

FIG. 2 illustrates a storage device according to an exemplary embodiment. Referring to FIG. 2, a storage device 10 includes a fingerprint sensor 11.

The storage device 10 may be a secure storage device for storing secure data. In addition, the storage device 10 may be a removable or portable storage device. In the exemplary embodiment as illustrated in FIG. 2, the storage device 10 may be a removable solid-state drive (SSD). In other embodiments, such as the one illustrated in FIG. 19, the storage device 10 may be a universal flash storage (UFS) or an embedded multi-media card (eMMC) or the like. However, the storage device 10 is not limited thereto, so it shall be understood that the storage device 10 may be implemented using various types of storage technologies.

The fingerprint sensor 11 may be implemented to recognize a fingerprint of a user. For example, the fingerprint of the user may be stored in an internal memory of the storage device 10 for a user registration or enrollment. The fingerprint, such as a registered fingerprint stored in the internal memory of the storage device 10, may be data that are encrypted or encoded, such as hash coded, for example, according to a manner determined in advance. A sensed fingerprint may be compared with the fingerprint stored in the internal memory of the storage device 10 for a user authentication.

Although the storage device 10 including the fingerprint sensor 11 is illustrated in FIG. 1, embodiments are not limited thereto. The storage device 10 may be implemented to include various types of biometric recognition sensors for authenticating the user in addition to or in lieu of the exemplary fingerprint sensor, such as, for example, an iris sensor, a heartbeat sensor, a vein sensor, a voice sensor, a brainwave sensor, a DNA sensor, other biometric sensors, or the like.

In an exemplary embodiment, as will be described with reference to FIG. 14, the fingerprint sensor 11 may be enabled or activated in a secure mode or security mode of the storage device 10. The storage device 10 may include at least one storage area corresponding to a fingerprint of a registered or enrolled user. For example, the storage area may be a logical drive of the storage device 10 recognized by an external host device. In the secure mode of the storage device 10, the host device may access a corresponding logical drive only when a sensed fingerprint is recognized as matching, such as being substantially equal to or substantially the same as, the registered fingerprint.

Figure 3:
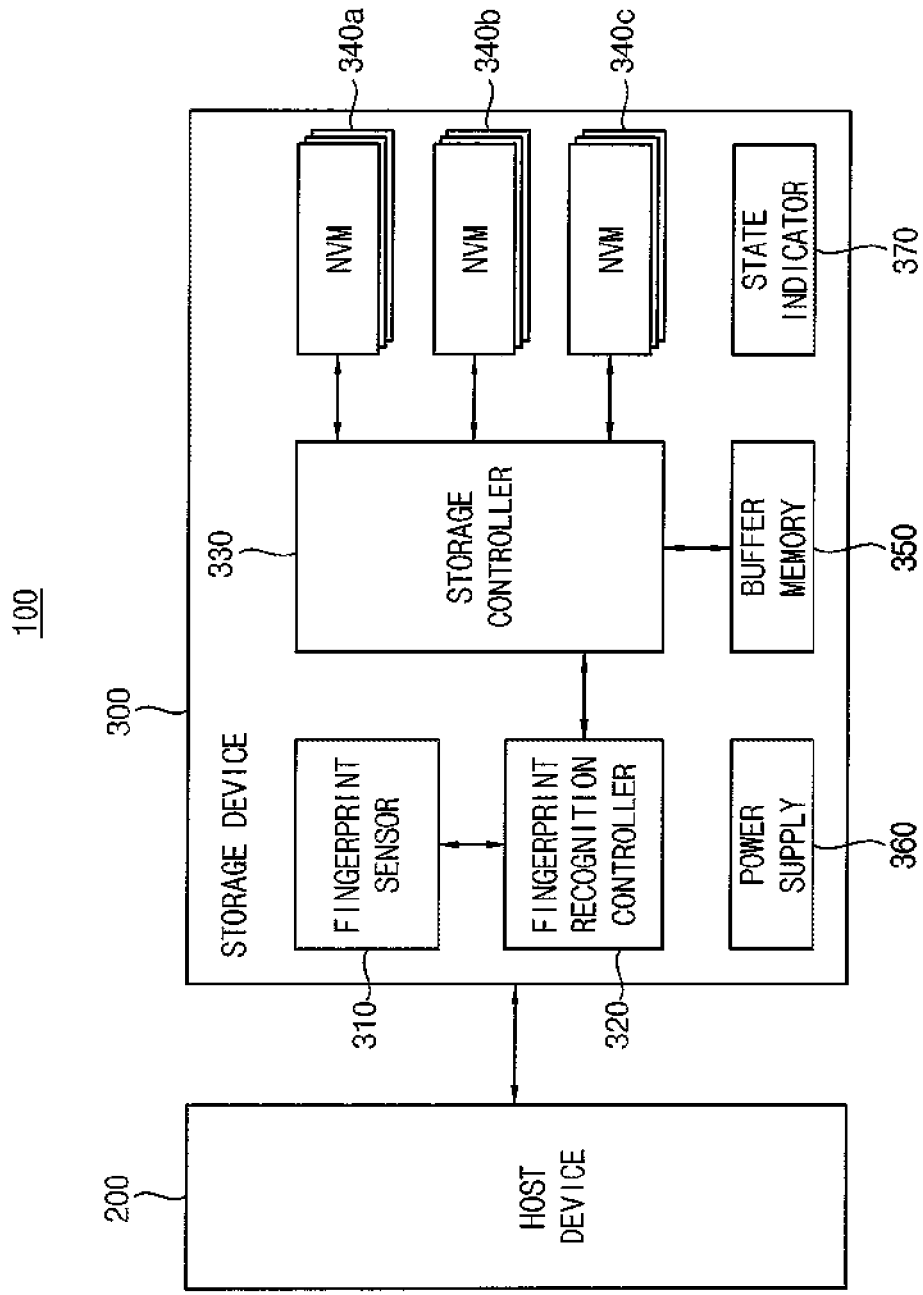
FIG. 3 is a schematic block diagram illustrating a storage device and a storage system including the storage device according to an exemplary embodiment.

FIG. 3 illustrates a storage device and a storage system including the storage device according to an exemplary embodiment. Referring to FIG. 3, a storage system 100 includes a host device 200 in signal communication with a storage device 300.

The host device 200 controls overall operations of the storage system 100. Although not illustrated in FIG. 3, the host device 200 may include a host processor and a host memory. The host processor may control an operation of the host device 200. For example, the host processor may execute an operating system (OS). The host memory may store instructions and/or data that are executed and/or processed by the host processor. For example, the operating system executed by the host processor may include a file system for file management and a device driver for controlling peripheral devices, including the storage device 300, at the operating system level.

The storage device 300 is accessed by the host device 200. The storage device 300 includes a fingerprint sensor 310, a storage controller 330, a plurality of nonvolatile memories 340a, 340b and 340c connected to the storage controller, and a power supply 360. The storage device 300 may further include a fingerprint recognition controller 320 connected between the fingerprint sensor and the storage controller, a buffer memory 350 connected to the storage controller, and a state indicator 370.

The fingerprint sensor 310 senses a fingerprint of a user. The fingerprint sensor 310 may be implemented to sense an electrical characteristic difference due to ridge and valley shapes of the fingerprint. For example, the fingerprint sensor 310 may be implemented to sense a difference between capacitances corresponding to fingerprints, that is, a capacitance signal and to convert the sensed capacitance signal into an electrical signal. It should be understood that a fingerprint sensor according to an exemplary embodiment is able to sense a fingerprint in various manners, such as in a capacitance manner. For example, the fingerprint sensor may be implemented with an optical image capture fingerprint sensor, an ultrasonic image capture fingerprint sensor, or the like.

The fingerprint recognition controller 320 may control overall operations of the fingerprint sensor 310 and may determine whether to enable or activate the fingerprint sensor 310. For example, the fingerprint recognition controller 320 may enable the fingerprint sensor 310 based on an operation mode of the storage device 300. The fingerprint recognition controller 320 may receive information about the operation mode of the storage device 300 from the storage controller 330. For example, when the operation mode is a secure mode, the fingerprint recognition controller 320 may enable the fingerprint sensor 310.

In addition, the fingerprint recognition controller 320 may convert a received fingerprint into a form of data that is suitable to be registered or enrolled in an internal memory of the storage device 300. For example, the internal memory may be at least one of the nonvolatile memories 340a, 340b and/or 340c. For example, the fingerprint recognition controller 320 may receive a sensed fingerprint from the fingerprint sensor 310, may convert or code the received fingerprint based on an algorithm determined in advance, and may provide the converted fingerprint to the storage controller 330 for fingerprint registration or enrollment of the user. For example, with regard to registering and authenticating a user fingerprint, the fingerprint recognition controller 320 may provide the storage controller 330 with a data write and/or read request.

In addition, for the user authentication, the fingerprint recognition controller 320 may compare a fingerprint sensed by the fingerprint sensor 310 with a fingerprint registered in the internal memory of the storage device 300. For example, the fingerprint recognition controller 320 may determine whether a user is authorized, such as by receiving a sensed fingerprint from the fingerprint sensor 310, by reading a registered fingerprint of the user from the nonvolatile memories 340a, 340b and/or 340c, and by comparing the received fingerprint with the read fingerprint.

The storage controller 330 may control an operation of the storage device 300 and/or operations of the plurality of nonvolatile memories 340a, 340b and 340c based on a command and data that are received from the host device 200.

The plurality of nonvolatile memories 340a, 340b and 340c may store the plurality of data. For example, the plurality of nonvolatile memories 340a, 340b and 340c may store meta data, various user data, registered fingerprint data, or the like.

In an exemplary embodiment, each of the plurality of nonvolatile memories 340a, 340b and 340c may include a flash memory, such as, for example, a NAND flash memory. In alternate embodiments, each of the plurality of nonvolatile memories 340a, 340b and 340c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

The buffer memory 350 may store instructions and/or data that are executed and/or processed by the storage controller 330, and may temporarily store data stored in or to be stored into the plurality of nonvolatile memories 340a, 340b and 340c. For example, the buffer memory 350 may include at least one of various volatile memories, such as a dynamic random-access memory (DRAM), or the like.

The power supply 360 may supply power to the storage device 300. For example, the power supply 360 may supply the power to the fingerprint sensor 310, the fingerprint recognition controller 320, the storage controller 330, the plurality of nonvolatile memories 340a, 340b and 340c, the buffer memory 350 and the state indicator 370, which are elements included in the storage device 300. For example, the power supply 360 may receive the power through the host device 200, and may include a cable connector for electrical connection with the host device 200.

The state indicator 370 may display a result of the fingerprint recognition operation, such as a fingerprint authentication or identification state, associated with the storage device 300. For example, the state indicator 370 may include a plurality of light emitting diodes, such as Green, Red and Yellow, for displaying the fingerprint authentication state. For example, a green light emitting diode may indicate that a user fingerprint is the same as a registered or enrolled fingerprint, a red light emitting diode may indicate that the user fingerprint is different from the registered fingerprint, and a yellow light emitting diode may indicate that no registered fingerprint exists and/or that a new fingerprint is being registered. However, the number and/or types of diodes included in the state indicator 370 is not limited thereto. In addition, the state indicator 370 may be implemented with a display device, such as a liquid crystal display (LCD), for displaying the fingerprint authentication state.

Although the fingerprint sensor 310, the fingerprint recognition controller 320 and the state indicator 370 are illustrated in FIG. 3 as independent configurations, embodiments thereof are not limited thereto. For example, the fingerprint sensor 310, the fingerprint recognition controller 320 and the state indicator 370 may be implemented within one fingerprint recognition module.

The storage device 300 performs the method described with reference to FIG. 1. For example, the power supply 360 supplies the power to the storage device 300. Immediately after the power is supplied to the storage device 300, the storage controller 330 sets the storage device 300 to the standby mode by performing the initialization operation on the storage device. The storage controller 330 performs the fingerprint recognition operation by performing the fingerprint recognition preparation operation and using the fingerprint sensor 310. When the initialization operation is completed and an operation of setting the storage device 300 to the standby mode is completed, and when the fingerprint recognition operation is successfully completed, the storage controller 330 sets the storage device 300 to the normal access mode such that the host device 200 is allowed to access the storage device 300. The initialization operation and the fingerprint recognition preparation operation are simultaneously or concurrently performed in parallel, and the initialization operation is started before the fingerprint recognition operation is completed. In other words, instead of performing the initialization operation after the fingerprint recognition operation, the initialization operation may be performed immediately after the power is supplied, and thus the driving speed of the storage device 300 may be improved. In addition, the storage device 300 may perform a method which will be described with reference to FIG. 14.

In an exemplary embodiment, the storage device 300 may be a solid-state drive (SSD). In alternate embodiments, the storage device 300 may be one of a universal flash storage (UFS), a multi-media card (MMC), an embedded multimedia card (eMMC), a secure digital (SD) card, a micro SD card, a memory stick, a chip card, a universal serial bus (USB) card, a smart card, a compact flash (CF) card, or the like.

In an exemplary embodiment, the storage device 300 may be connected to the host device 200 via a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 340a, 340b and 340c to provide the block accessible interface to the host device 200, for allowing the access by units of a memory block with respect to data stored in the plurality of nonvolatile memories 340a, 340b and 340c.

In an exemplary embodiment, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, drone, or the like. In alternate embodiments, the storage system 100 may be any computing system, such as a personal computer (PC), a server computer, a data center, a workstation, a digital television, a set-top box, a navigation system, or the like.

Figure 4:
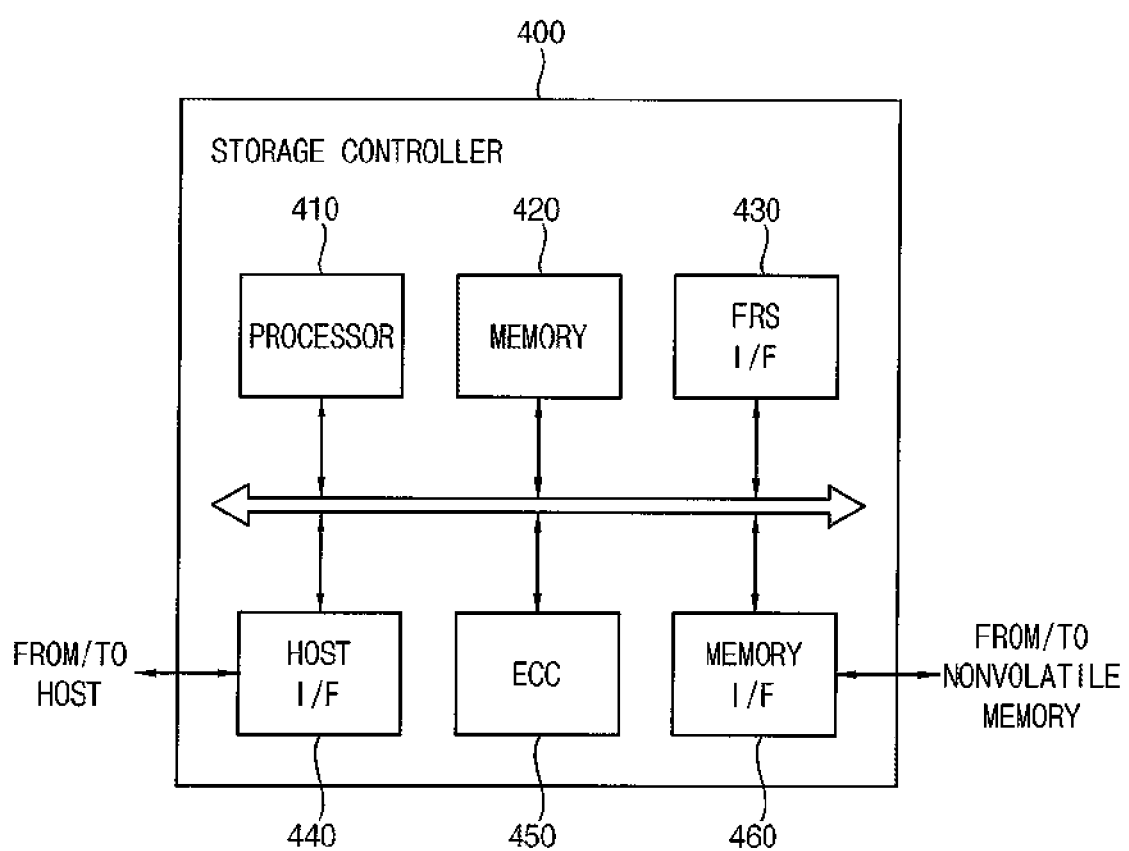
FIG. 4 is a schematic block diagram illustrating an example of a storage controller included in a storage device according to an exemplary embodiment.

FIG. 4 illustrates an example of a storage controller included in a storage device according to an exemplary embodiment. Referring to FIG. 4, a storage controller 400 may include at least one processor 410, a memory 420, a fingerprint sensor interface 430, a host interface 440, an error correction code (ECC) block 450 and a memory interface 460, each connected to a communications bus.

The processor 410 may control an operation of the storage controller 400 in response to a command received via the host interface 440 from a host device (e.g., the host device 200 in FIG. 3). In alternate embodiments, the processor 410 may control respective components by employing firmware for operating a storage device, such as the storage device 300 in FIG. 3.

The memory 420 may store instructions and data executed and processed by the processor 410. For example, the memory 420 may be implemented with a volatile memory device with relatively small capacity and high speed, such as a static random-access memory (SRAM), a cache memory, or the like.

The fingerprint sensor interface 430 may provide a function for interfacing with a fingerprint recognition controller (e.g., the fingerprint recognition controller 320 in FIG. 3). For example, the fingerprint sensor interface 430 may be a sideband interface, and the sideband interface may be an inter integrated circuit (I2C) interface.

The ECC block 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like, or may perform ECC encoding and ECC decoding using above-described codes or other error correction codes.

The host interface 440 may provide physical connections between the host device 200 and the storage device 300. The host interface 440 may provide an interface corresponding to a bus format of the host for communication between the host device 200 and the storage device 300. In an exemplary embodiment, the bus format of the host device 200 may be a small computer system interface (SCSI) or a serial attached SCSI (SAS) interface. In alternate embodiments, the bus format of the host device 200 may be a USB, a peripheral component interconnect (PCI) express (PCIe), an advanced technology attachment (ATA), a parallel ATA (PATA), a serial ATA (SATA), a nonvolatile memory (NVM) express (NVMe), or the like, format.

The memory interface 460 may exchange data with nonvolatile memories (e.g., the nonvolatile memories 340a, 340b and 340c in FIG. 3). The memory interface 460 may transfer data to the nonvolatile memories 340a, 340b and 340c, or may receive data read from the nonvolatile memories 340a, 340b and 340c. In an exemplary embodiment, the memory interface 460 may be connected to the nonvolatile memories 340a, 340b and 340c via one channel. In alternate embodiments, the memory interface 460 may be connected to the nonvolatile memories 340a, 340b and 340c via two or more channels.

Figure 5:
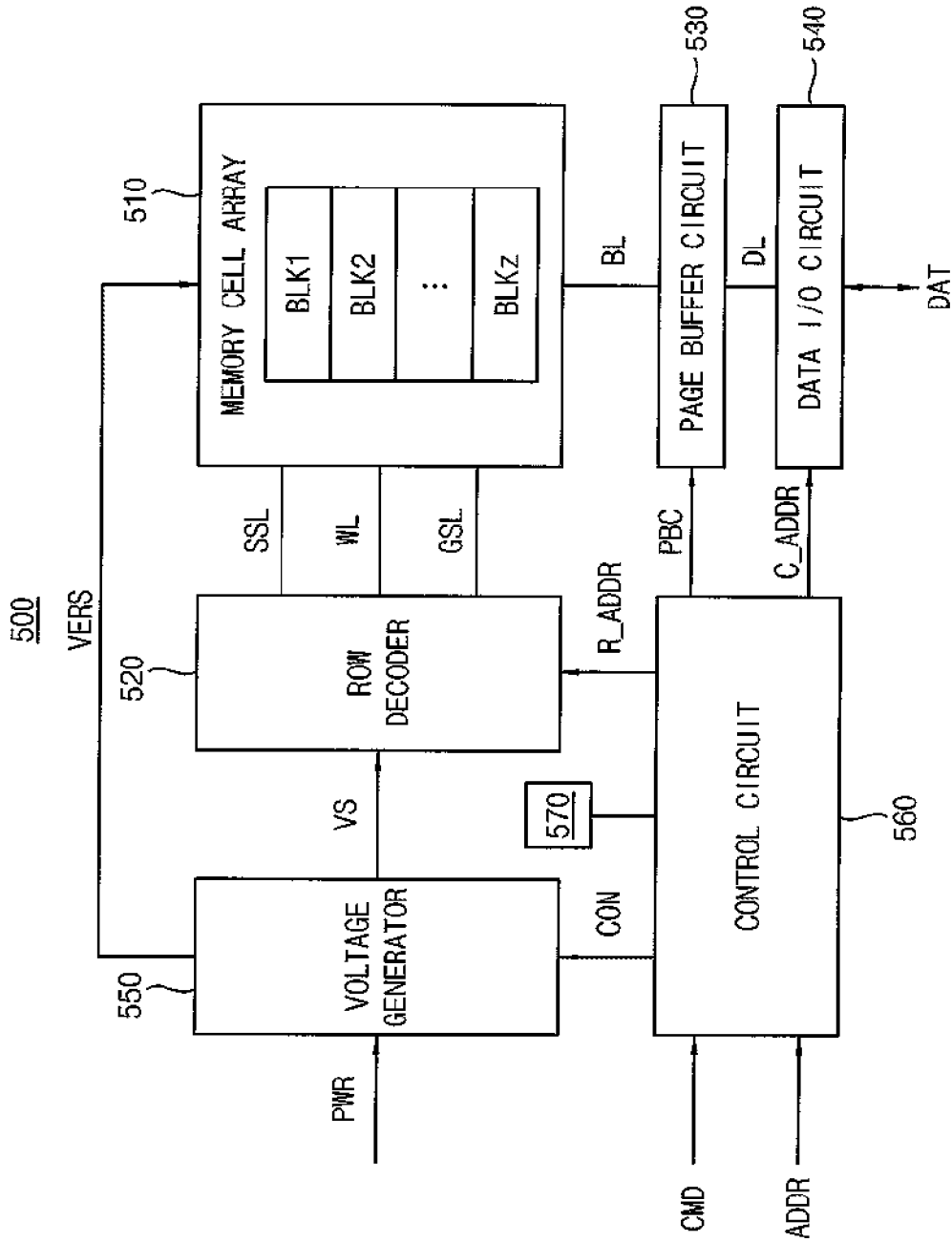
FIG. 5 is a schematic block diagram illustrating an example of a nonvolatile memory included in a storage device according to an exemplary embodiment.

FIG. 5 illustrates an example of a nonvolatile memory included in a storage device according to an exemplary embodiment. Referring to FIG. 5, a nonvolatile memory 500 includes a memory cell array 510, a row decoder 520 connected to the memory cell array, a page buffer circuit 530 connected to the memory cell array, a data input/output (I/O) circuit 540 connected to the page buffer circuit, a voltage generator 550 connected to the memory cell array, a control circuit 560 connected to the voltage generator and a temperature sensor 570 connected to the control circuit.

The memory cell array 510 is connected to the row decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells, such as, for example, a plurality of nonvolatile memory cells, that are each connected to one of the plurality of wordlines WL and one of the plurality of bitlines BL. The memory cell array 510 may be divided into a plurality of memory blocks BLK1, BLK2, ..., BLKz each of which includes memory cells. In addition, each of the plurality of memory blocks BLK1, BLK2, ..., BLKz, which may be divided into a plurality of pages.

In an exemplary embodiment, the plurality of memory cells may be arranged in a two-dimensional (2D) array structure or a three dimensional (3D) vertical array structure. A three-dimensional vertical array structure may include vertical cell strings that are vertically oriented such that at least one memory cell is located over another memory cell. The at least one memory cell may comprise a charge trap layer. The following United States patent documents, which are hereby incorporated by reference in their entireties for their recitations of non-essential subject matter, may describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 560 receives a command CMD and an address ADDR from the outside, such as from the host device 200 and/or the storage controller 330 of FIG. 2, and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operations may include a normal read operation and data recovery read operation.

For example, the control circuit 560 may generate control signals CON, which are used for controlling the voltage generator 550, and may generate a control signal PBC for controlling the page buffer circuit 530, based on the command CMD, and may further generate a row address R_ADDR and a column address C_ADDR based on the address ADDR. The control circuit 560 may provide the row address R_ADDR to the row decoder 520 and may provide the column address C_ADDR to the data I/O circuit 540.

The row decoder 520 may be connected to the memory cell array 510 via the plurality of string selection lines SSL, the plurality of wordlines WL and the plurality of ground selection lines GSL.

The voltage generator 550 may generate voltages VS that are required for an operation of the nonvolatile memory device 500 based on a power signal PWR and the control signals CON. The voltages VS may be applied to the plurality of string selection lines SSL, the plurality of wordlines WL and the plurality of ground selection lines GSL by the row decoder 520. In addition, the voltage generator 550 may generate an erase voltage VERS that is required for the data erase operation based on the power signal PWR and the control signals CON. The erase voltage VERS may be applied to the memory cell array 510 directly or via the bitlines BL.

The page buffer circuit 530 may be connected to the memory cell array 510 via the plurality of bitlines BL. The page buffer circuit 530 may include a plurality of page buffers. In an exemplary embodiment, each page buffer may be connected to one bitline. In alternate embodiments, each page buffer may be connected to two or more bitlines.

The page buffer circuit 530 may store data DAT to be programmed into the memory cell array 510 via the bitlines BL or may read data DAT sensed from the memory cell array 510. In other words, the page buffer circuit 530 may operate as a write driver or a sensing amplifier according to an operation mode of the nonvolatile memory device 500.

The data I/O circuit 540 may be connected to the page buffer circuit 530 via data lines DL. The data I/O circuit 540 may provide the data DAT from an outside of the nonvolatile memory device 500 to the memory cell array 510 via data lines DL to the page buffer circuit 530 or may provide the data DAT from the memory cell array 510 to the outside of the nonvolatile memory device 500, based on the column address C_ADDR.

Figure 6:
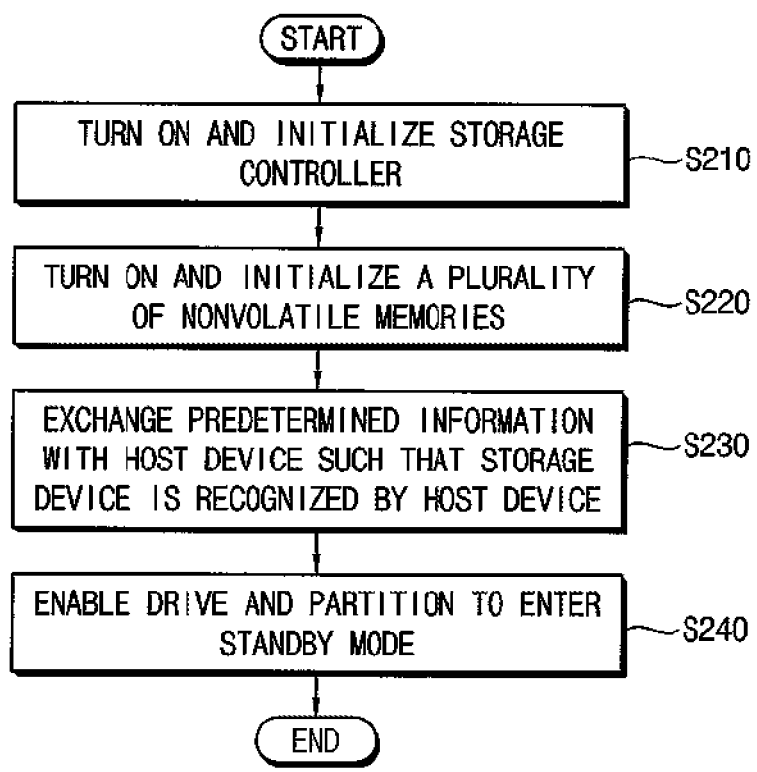
FIG. 6 is a flowchart diagram illustrating an example of setting a storage device to a standby mode in FIG. 1.
Figure 7A:
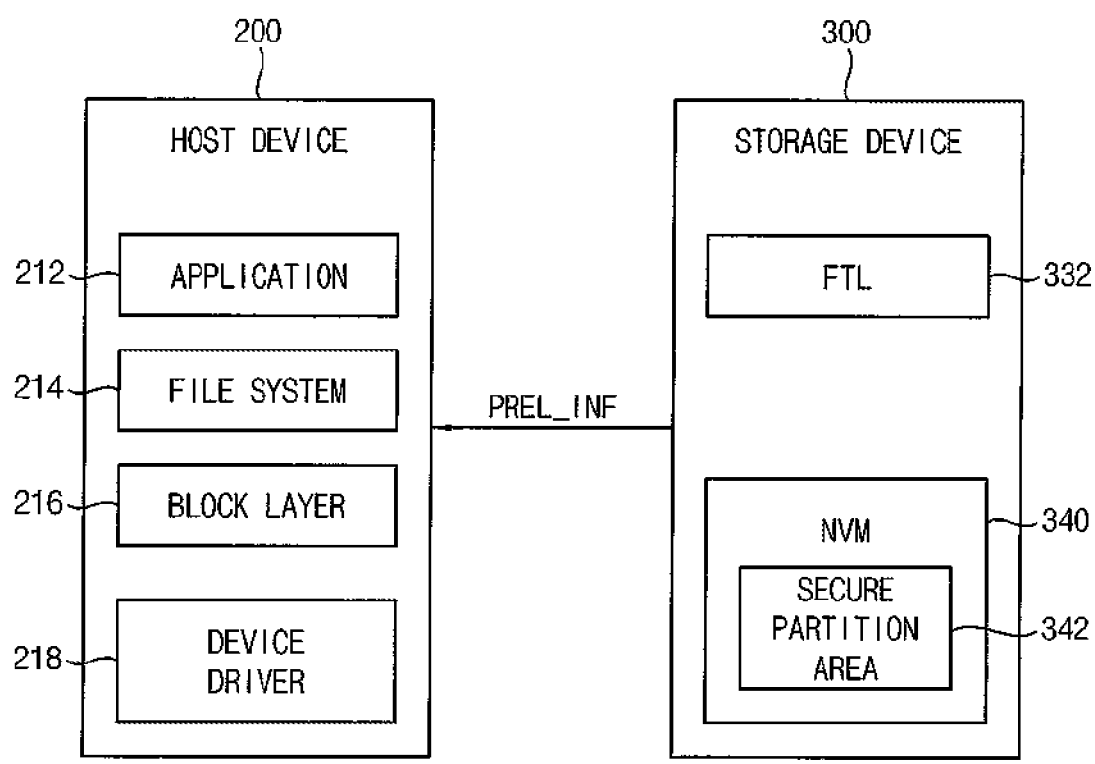
FIGS. 7A and 7B are schematic block diagrams for describing an operation of setting a storage device to a standby mode in FIG. 6.
Figure 7B:
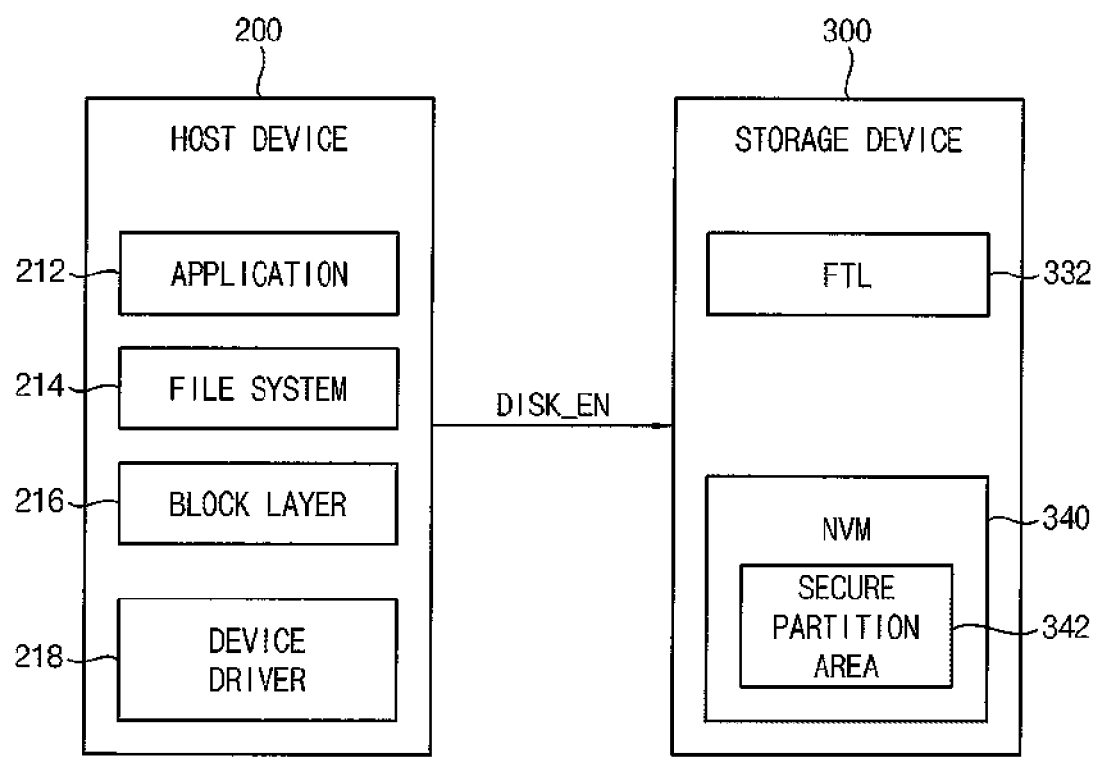

FIG. 6 illustrates a more detailed example of setting the storage device to a standby mode as introduced at step S200 of FIG. 1. FIGS. 7A and 7B illustrate signal flow for the operation of setting a storage device to the standby mode as described in FIG. 6.

Referring to FIGS. 1, 3, 6, 7A and 7B, when setting the storage device to the standby mode, as in step S200 of FIG. 1, the storage controller 330 of FIG. 3 included in the storage device 300 of FIGS. 3, 7A and 7B may be turned on and initialized at the step S210 of FIG. 6. The plurality of nonvolatile memories 340a, 340b and 340c of FIG. 3 included in the storage device 300 may be turned on and initialized at step S220 of FIG. 6. For example, the operations of turning on and initializing the storage controller 330 and the nonvolatile memories 340a, 340b and 340c may represent operations of supplying power and booting the storage controller 330 and the nonvolatile memories 340a, 340b and 340c.

After that, predetermined information may be exchanged with the host device 200 such that the storage device 300 is recognized by the host device 200 at step S230. When a connection with the host device 200 is completed, a disk or drive and a partition corresponding to the storage device 300 may be enabled to enter the standby mode at step S240. In step S240, the connection with the host device 200 may represent a logical connection, rather than an electrical and/or physical connection. The initialization operation including steps S210, S220, S230 and S240 may be started before the fingerprint recognition operation in step S300 of FIG. 1 is performed.

For example, as illustrated in FIGS. 7A and 7B, the host device 200 may include an application 212, a file system 214, a block layer 216 and a device driver 218. The storage device 300 may include a flash translation layer (FTL) 332 and a nonvolatile memory 340. The application 212, the file system 214, the block layer 216 and the device driver 218 of the host device 200 may be referred to as a high level of the storage system 100 of FIG. 3. The flash translation layer 332 and the nonvolatile memory 340 of the storage device 300 may be referred to as a low level of the storage system 100.

The application 212 may be an application software program that is executed on an operating system. For example, the application 212 may have been programmed to aid in generating, copying and/or deleting a file.

The file system 214 may manage files used by the host device 200. For example, the file system 214 may manage file names, extensions, file attributes, file sizes, cluster information, or the like, of files accessed by requests from the host device 200 or applications executed by the host device 200. The file system 214 may generate, delete and manage data on a file basis. For example, the file system 214 may manage the files based on a log-structured scheme in which data and meta data are written sequentially to a circular buffer, called a log.

The block layer 216 may be referred to as a block input/output layer or manager, and may perform data read/write operations by units of a memory block. In other words, the block accessible interface may be implemented based on the block layer 216.

The device driver 218 may control the storage device 300 at the operating system level. For example, the device driver 218 may be a software module of a kernel for controlling the storage device 300. The host device 200 or the applications executed by the host device 200 may request the data read/write operations to the storage device 300 via the device driver 218.

The flash translation layer 332 of FIGS. 7A and 7B may be controlled by the storage controller 330 of FIG. 3, may translate a logical address provided from the host device 200 into a physical address in the nonvolatile memory 340, and may manage data stored in the nonvolatile memory 340.

The nonvolatile memory 340 may be substantially the same as the nonvolatile memories 340a, 340b and 340c in FIG. 3, so duplicate description may be omitted. For example, the nonvolatile memory 340 may store the meta data, the various user data, or the like, and may include a secure partition area 342 accessible after the fingerprint recognition operation is successfully completed by the storage device 300.

Steps S230 and S240 in FIG. 6 will be described in detail with reference to FIGS. 7A and 7B. First, as illustrated in FIG. 7A, the storage device 300 may transmit predetermined information PREL_INF to the host device 200 such that the host device 200 recognizes the storage device 300. For example, the predetermined information PREL_INF may be information for pre-loading the storage device 300. Although not illustrated in FIG. 7A, if necessary, the storage device 300 may receive information from the host device 200. The host device 200 may perform a procedure for recognizing the storage device 300 and a procedure for using the storage device 300 in advance, based on the predetermined information PREL_INF.

Next, as illustrated in FIG. 7B, when a logical connection between the host device 200 and the storage device 300 is completed, the storage device 300 may receive a disk enable signal DISK_EN from the host device 200. A drive and a partition corresponding to the storage device 300, such as corresponding to the secure partition area 342, for example, may be enabled or activated in advance based on the disk enable signal DISK_EN, and the storage device 300 may enter the standby mode.

In an exemplary embodiment, when the execution of steps S210, S220, S230 and S240 is completed, the host device 200 may not yet be allowed to access the storage device 300 although the host device 200 recognizes the storage device 300, and the drive and the partition corresponding to the storage device 300 are enabled. That is, access by the host device 200 to the storage device 300 may not yet be possible, as will be described with reference to FIGS. 8A, 8B, 9A and 9B.

Figure 8A:
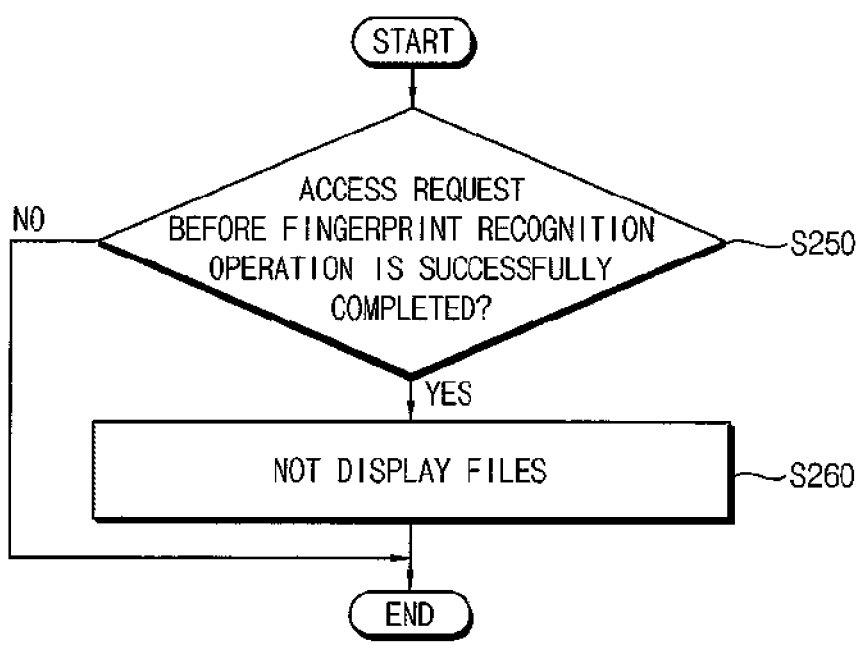
FIGS. 8A, 8B, 9A and 9B are flowchart, graphical user interface (GUI), flowchart and GUI diagrams, respectively, for describing operations in a standby mode.
Figure 8B:
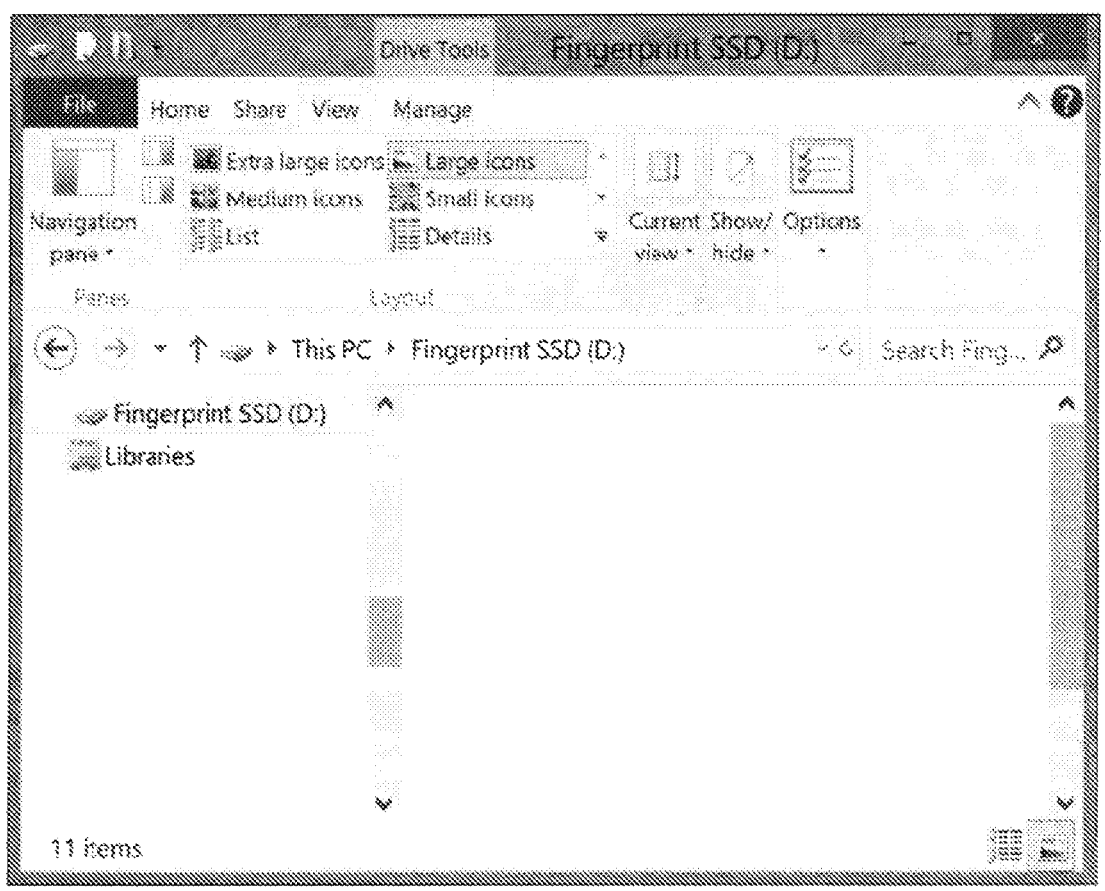

FIGS. 8A, 8B, 9A and 9B illustrate operations in a standby mode. Referring to FIGS. 8A and 8B, after the initialization operation is completed and the operation of setting the storage device to the standby mode is completed by the steps S210, S220, S230 and S240 of FIG. 6, and before the fingerprint recognition operation in step S300 of FIG. 1 is successfully completed, the external host device may generate an access request to attempt to access the storage device. For example, the application 212 in FIGS. 7A and 7B may generate a file request for a specific file, the file system 214 in FIGS. 7A and 7B may generate a read request and/or a write request corresponding to the file request, and the block layer 216 in FIGS. 7A and 7B may generate an input/output request corresponding to the read request or the write request. At least one of the file request, the read request or the write request and the input/output request may correspond to the access request.

When the storage device is to be accessed by the external host device after the operation of setting the storage device to the standby mode is completed and before the fingerprint recognition operation is successfully completed at step S250 with an outcome of YES, at least some files stored in the storage device may not be displayed at step S260. For example, as illustrated in FIG. 8B, when the external host device wants to access the D drive, no files stored in the D drive may be displayed.

Figure 9A:
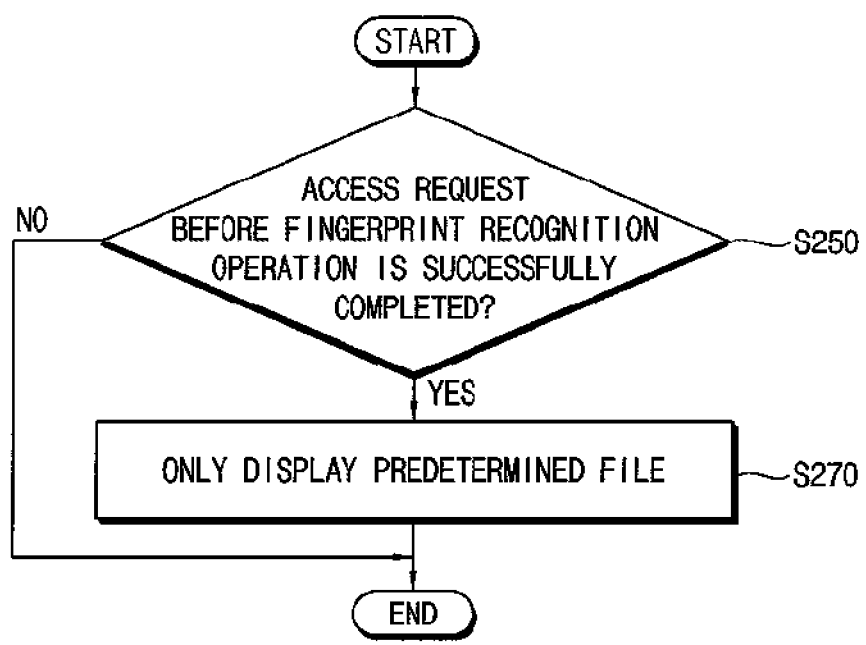
Figure 9B:
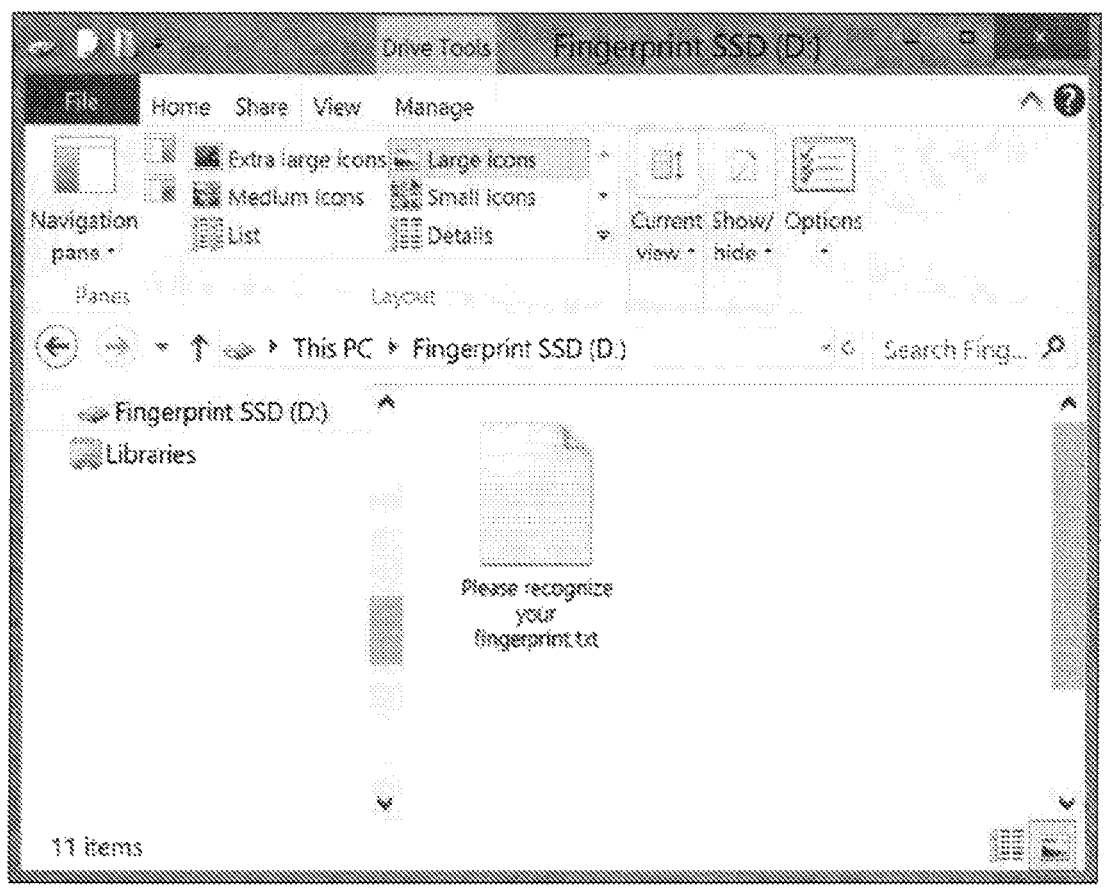

Referring to FIGS. 9A and 9B, step S250 in FIG. 9A may be substantially the same as step S250 in FIG. 8A, so duplicate description may be omitted. When the storage device is to be accessed by the external host device after the operation of setting the storage device to the standby mode is completed and before the fingerprint recognition operation is successfully completed at step S250 with an outcome of YES, only a predetermined or public file among files stored in the storage device may be displayed at step S270. For example, as illustrated in FIG. 9B, when the external host device wants to access the D drive, only a file named "please recognize your fingerprint" may be displayed and the remaining files, such as secure files, may not be displayed.

In FIGS. 8A and 9A, when the storage device is not to be accessed by the external host device after the operation of setting the storage device to the standby mode is completed at step S250 with an outcome of NO, the storage device may wait in the standby mode, and the process may proceed to step S400 of FIG. 1 without any additional actions.

Figure 10:
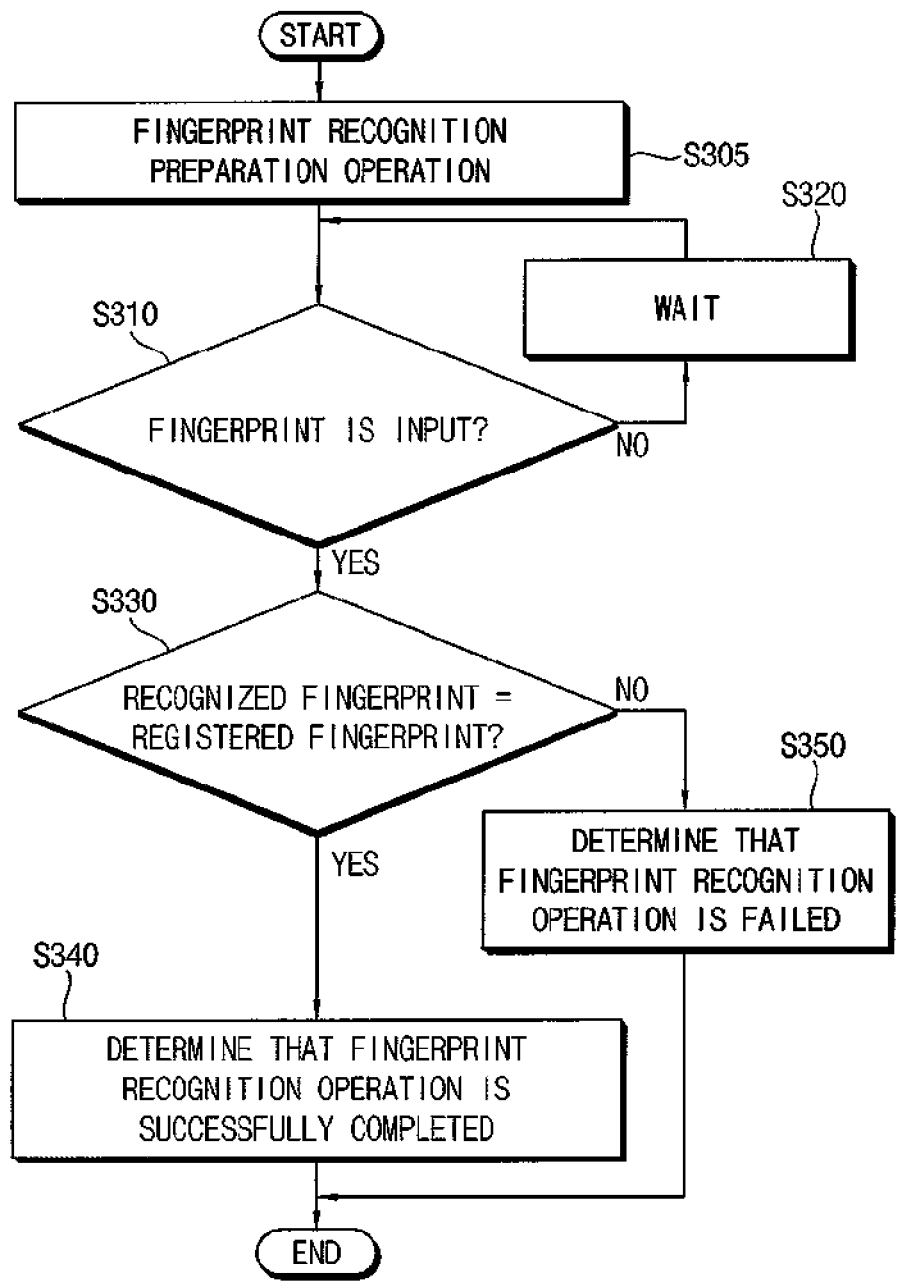
FIGS. 10 and 11 are flowchart diagrams illustrating examples of performing a fingerprint recognition operation in FIG. 1.
Figure 11:
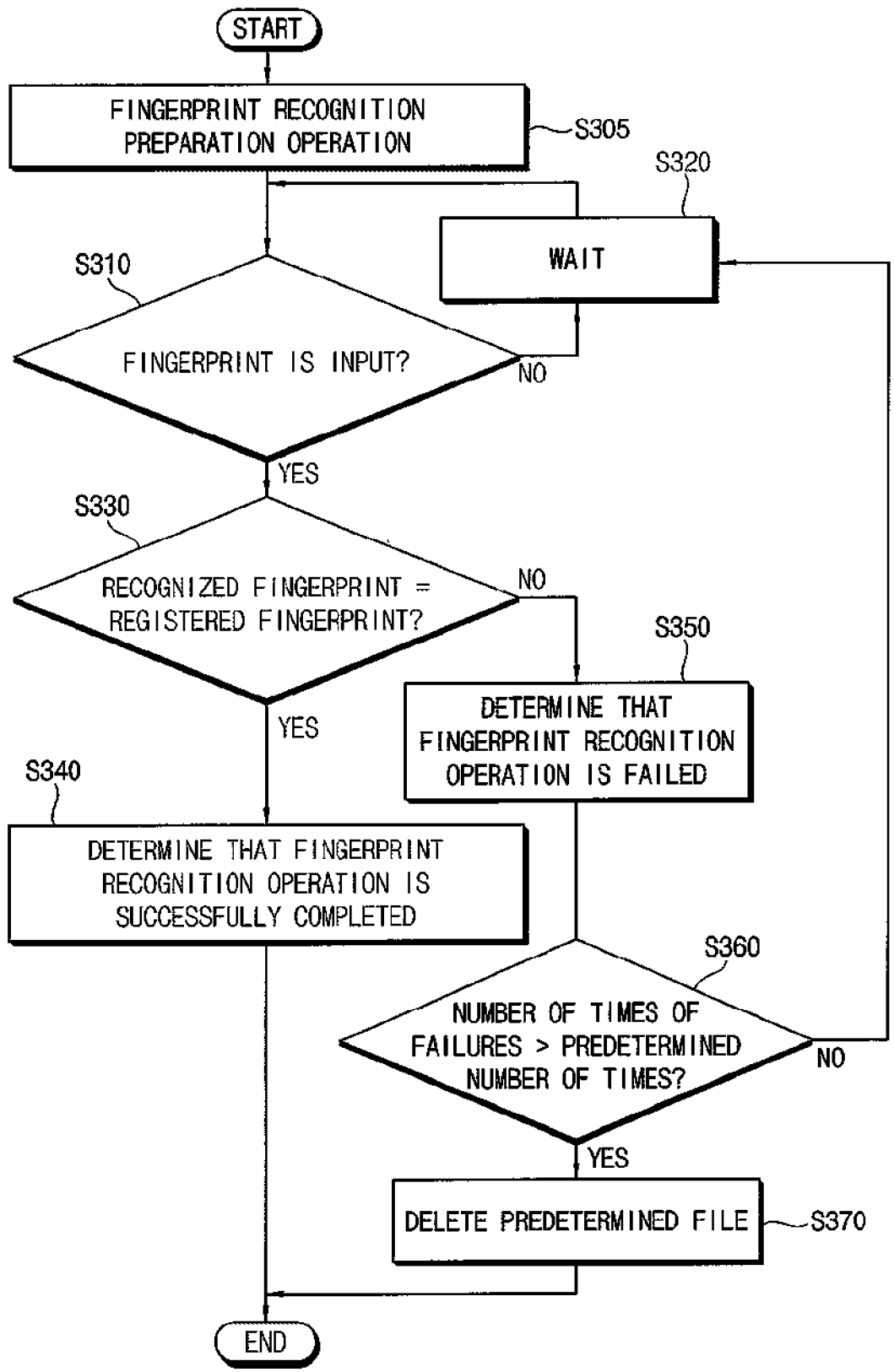

FIGS. 10 and 11 illustrate examples of performing a fingerprint recognition operation in FIG. 1. Referring to FIGS. 1, 3 and 10, when performing the fingerprint recognition operation at step S300, the fingerprint recognition preparation operation may be performed first at step S305. For example, the fingerprint sensor 310 may be enabled or activated, and a procedure or preparation process required for the fingerprint recognition operation may be performed. For example, step S305 may be performed simultaneously or concurrently with the initialization operation.

It may be determined whether the fingerprint of the user is input from the fingerprint sensor 310 at step S310. For example, step S310 may be performed while the initialization operation of step S200 is performed after the power is supplied to the storage device 300, or may be performed after the initialization operation of step S200 is completed and the operation of setting the storage device to the standby mode is completed.

When the fingerprint of the user is not input from the fingerprint sensor 310 at step S310 with an outcome of NO, the storage device 300 may wait until the fingerprint of the user is input at step S320. When the fingerprint of the user is input from the fingerprint sensor 310 at step S310 with an outcome of YES, a fingerprint sensed by the fingerprint sensor 310 may be compared with a registered or enrolled fingerprint at step S330. For example, the registered fingerprint may be obtained and stored in advance in a fingerprint registration operation which will be described with reference to FIG. 13.

When the fingerprint sensed by the fingerprint sensor matches the registered fingerprint at step S330 with an outcome of YES, it may be determined that the fingerprint recognition operation is successfully completed at step S340. When the fingerprint sensed by the fingerprint sensor does not match the registered fingerprint at step S330 with an outcome of NO, it may be determined that the fingerprint recognition operation has is unsuccessful at step S350, and the fingerprint recognition process may be terminated.

In an exemplary embodiment, when the fingerprint sensed by the fingerprint sensor does not match the registered fingerprint at step S330 with an outcome of NO, the process may proceed to step S320, and the storage device may wait until the fingerprint of the user is input again.

Referring to FIGS. 1, 3 and 11, steps S310, S320, S330, S340 and S350 in FIG. 11 may be substantially the same as steps S310, S320, S330, S340 and S350 in FIG. 10, respectively, so duplicate description may be omitted. When the fingerprint sensed by the fingerprint sensor does not match the registered fingerprint at step S330 with an outcome of NO, it may be determined that the fingerprint recognition operation is unsuccessful at step S350. In this example, it may be further checked whether the number of times that the fingerprint recognition operation was unsuccessful exceeds the predetermined number of times at step S360.

When the number of times that the fingerprint recognition operation was unsuccessful exceeds the predetermined number of times at step S360 with an outcome of YES, a predetermined file among files stored in the storage device may be deleted at step S370. For example, it may be determined that access to the storage device 300 is being attempted by an unauthorized user, and thus a protection function for secure data, such as private information, may be performed. For example, secure data in the storage device 300, which are determined in advance, may be deleted, sanitized or permanently discarded. The secure data to be deleted when the fingerprint recognition operation is unsuccessful may be determined by the storage device 300 or by host device 200.

When the number of times that the fingerprint recognition operation was unsuccessful is less than or equal to the predetermined number of times at step S360 with an outcome of NO, the process may proceed to step S320, and the storage device may wait until the fingerprint of the user is input again.

Figure 12A:
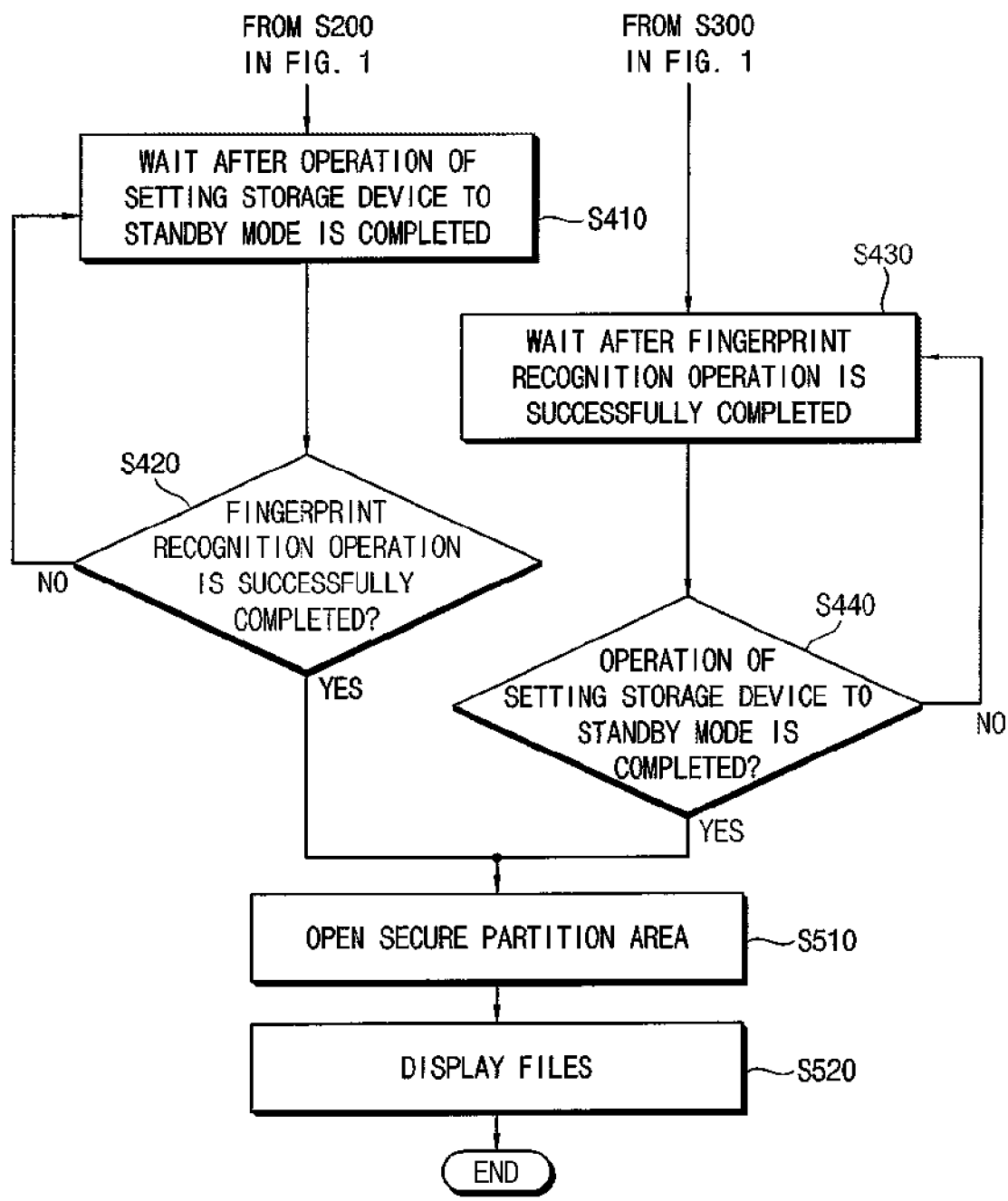
FIGS. 12A and 12B are flowchart and GUI diagrams, respectively, for describing an operation of setting a storage device to a normal access mode in FIG. 1.
Figure 12B:
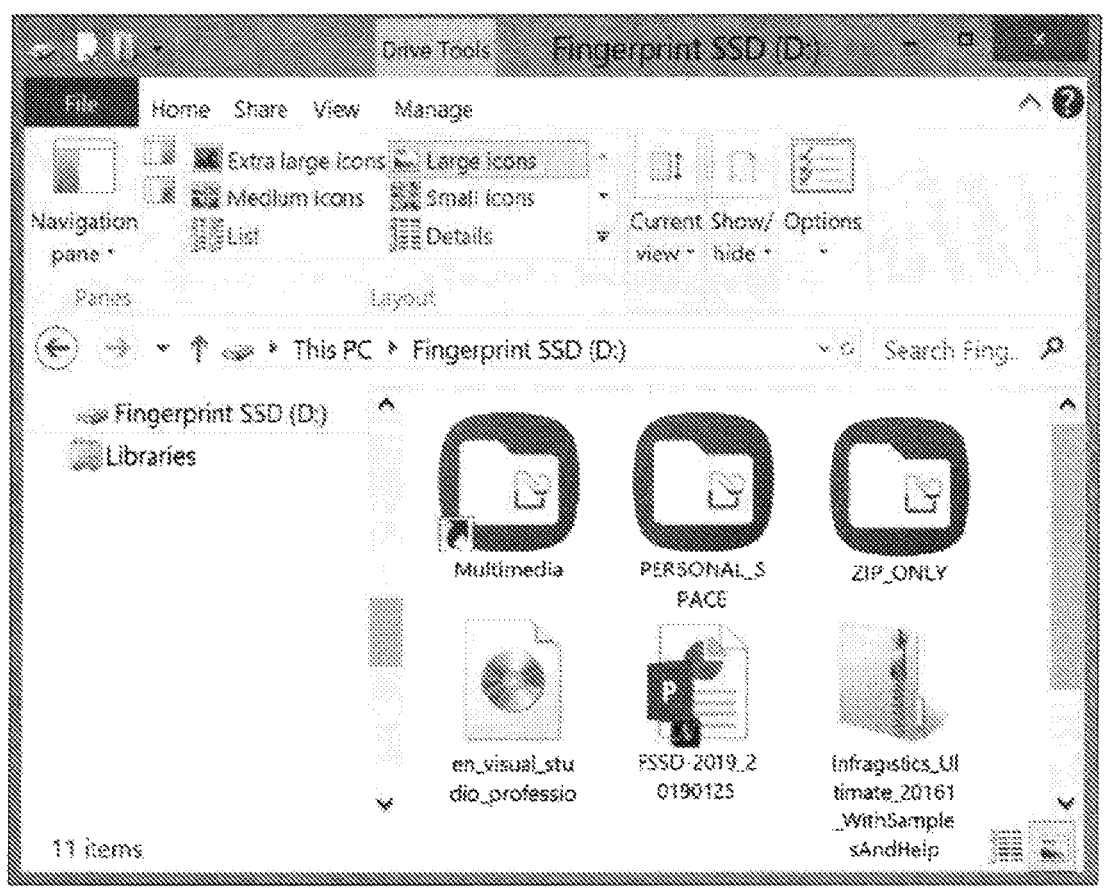

FIGS. 12A and 12B illustrate an operation of setting a storage device to a normal access mode in FIG. 1. Referring to FIGS. 1, 3, 12A and 12B, when the operation of setting the storage device 300 to the standby mode is completed first by step S200, the storage device 300 may wait for the successful completion of the fingerprint recognition operation at step S410. When the fingerprint recognition operation has not successfully completed yet at step S420 with an outcome of NO, the process may proceed to step S410, where it may still wait for the successful completion of the fingerprint recognition operation.

Similarly, when the fingerprint recognition operation is successfully completed first by step S300, the storage device 300 may wait for the completion of the operation of setting the storage device 300 to the standby mode at step S430. When the operation of setting the storage device 300 to the standby mode has not completed yet at step S440 with an outcome of NO, the process may proceed to step S430, where it may still wait for the completion of the operation of setting the storage device 300 to the standby mode.

When the operation of setting the storage device 300 to the standby mode is completed and the fingerprint recognition operation is successfully completed, such as when the fingerprint recognition operation has successfully completed after the operation of setting the storage device 300 to the standby mode has completed at step S420 with an outcome of YES, or when the operation of setting the storage device 300 to the standby mode is completed after the fingerprint recognition operation has successfully completed at step S440 with an outcome of YES, the storage device 300 is set to the normal access mode at step S500. For example, the drive and the partition, such as the secure partition area 342 in FIG. 7A, corresponding to storage device 300 may be opened at step S510, and the files stored in the storage device 300 may be normally displayed at step S520. For example, as illustrated in FIG. 12B, when the external host device attempts to access the D drive, all files stored in the D drive may now be normally displayed.

Figure 13:
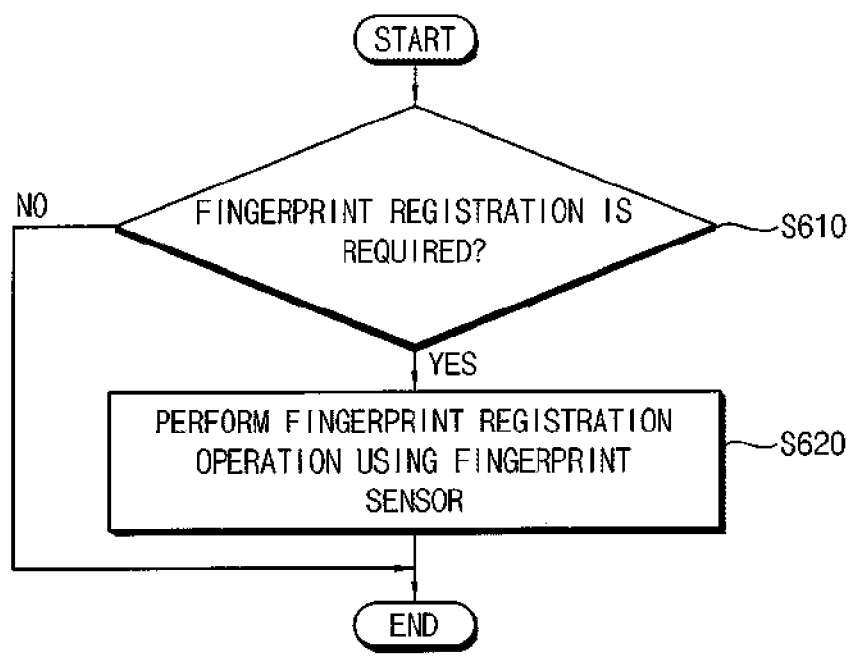
FIG. 13 is a flowchart diagram illustrating a fingerprint registration process performed by a storage device according to an exemplary embodiment.

FIG. 13 illustrates a fingerprint registration process performed by a storage device according to an exemplary embodiment. Referring to FIGS. 3 and 13, when performing a fingerprint registration process, it may be determined whether a fingerprint registration is required for the storage device 300 at step S610. For example, step S610 may be performed when the storage device 300 is connected to the host device 200 for the first time after the storage device 300 is manufactured and/or when a user request occurs.

When it is determined that fingerprint registration is required or otherwise necessary at step S610 with an outcome of YES, a fingerprint registration operation for registering the fingerprint of the user may be performed using the fingerprint sensor 310 at step S620. For example, the fingerprint registration operation may include operations of receiving a fingerprint registration request from the host device 200, sensing the fingerprint of the user in response to the received fingerprint registration request, registering and storing the sensed fingerprint as a fingerprint corresponding to the selected secure partition area 342 of the storage device 300, and notifying the host device 200 that the fingerprint registration has completed, such as when the fingerprint is stored in the storage device 300. After the fingerprint registration process of FIG. 13 is completed, the method of operating the storage device according to an exemplary embodiment described with reference to FIG. 1 may be performed. When it is determined that the fingerprint registration is not required, such as at step S610 with an outcome of NO, the fingerprint registration process may be terminated.

FIG. 14 illustrates a method of operating a storage device according to an exemplary embodiment. Duplicate description with respect to similarities of FIG. 1 may be omitted.

Referring to FIG. 14, a storage device according to an exemplary embodiment includes a plurality of nonvolatile memories, a storage controller and a fingerprint sensor. In addition, the storage device operates in one of a secure mode and a non-secure or normal mode. As will be described with reference to FIGS. 15A and 15B, the storage device, including, for example, the plurality of nonvolatile memories, may include a secure partition area accessible by the external host device in the secure mode and a public area accessible by the external host device in the non-secure mode.

In a method of operating the storage device according to an exemplary embodiment, steps S1100, S1300, S1400, S1500, S1502 and S1600 of FIG. 14 may be substantially the same as steps S100, S200, S300, S400, S402 and S500 of FIG. 1, respectively, so duplicate description may be omitted. After the power is supplied to the storage device, and before the initialization operation is performed on the storage device, an operation mode of the storage device may be determined or checked first at step S1200.

When the operation mode of the storage device is the secure mode, such as when the storage device operates in the secure mode at step S1200 with an outcome of YES, steps S1300, S1400, S1500, S1502 and S1600 may be performed, and thus the secure partition area of the storage device may be set to the normal access mode. When the process is performed up to step S1600 in the secure mode, the external host device may be allowed to access the secure partition area of the storage device. As described with reference to FIG. 1, the initialization operation in step S1300 and the fingerprint recognition preparation operation in step S1400 may be performed substantially simultaneously or concurrently performed in parallel, and the initialization operation in step S1300 may be started before the fingerprint recognition operation in step S1400 is performed.

When the operation mode of the storage device is the non-secure mode, such as when the storage device operates in the non-secure mode at step S1200 with an outcome of NO, the initialization operation may be performed on the storage device at step S1700. In the non-secure mode, the public area of the storage device may be set to the normal access mode at step S1800, without the operation of setting the storage device to the standby mode and the fingerprint recognition operation. When the process is performed up to step S1800 in the non-secure mode, the external host device may be allowed to access the public area of the storage device regardless of the fingerprint recognition operation.

In an exemplary embodiment, when the storage device operates in the secure mode at step S1200 with an outcome of YES, the fingerprint sensor may be enabled or activated to perform the fingerprint recognition operation. In addition, when the storage device operates in the non-secure mode at step S1200 with an outcome of NO, the fingerprint sensor may be disabled or deactivated because the fingerprint recognition operation has not been successfully performed.

Figure 15A:
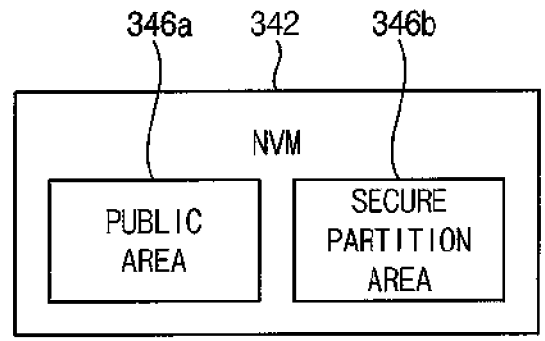
FIGS. 15A and 15B are hybrid schematic diagrams for describing a method of operating a storage device of FIG. 14.
Figure 15B:
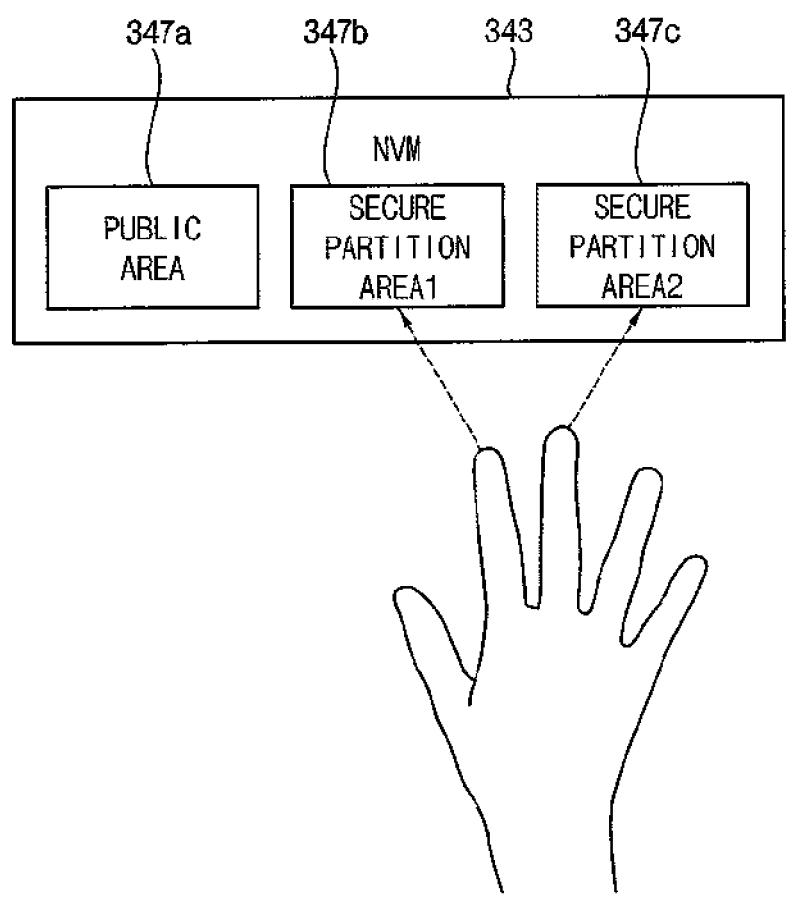

FIGS. 15A and 15B illustrate a method of operating a storage device of FIG. 14. Referring to FIG. 15A, a nonvolatile memory 342 included in the storage device may include a public area 346a and a secure partition area 346b.

The public area 346a may be used to store data that does not need security. As described with reference to FIG. 14, the public area 346a may be set to the normal access mode regardless of the fingerprint recognition operation, and the external host device may access the public area 346a regardless of the fingerprint recognition operation.

The secure partition area 346b may be used to store data, such as private information, that needs security. As described with reference to FIG. 14, the secure partition area 346b may be set to the standby mode first, and then may be set to the normal access mode after the fingerprint recognition operation has successfully completed. The external host device may access the secure partition area 346*b* after the fingerprint recognition operation has successfully completed.

Referring to FIG. 15B, a nonvolatile memory 343 included in the storage device may include a public area 347*a*, a first secure partition area 347*b* and a second secure partition area 347*c*. The public area 347*a* in FIG. 15B may be substantially the same as the public area 346*a* in FIG. 15A. Each of the first and second secure partition areas 347*b* and 347*c* in FIG. 15B may be substantially the same as the secure partition area 346*b* in FIG. 15A.

In an exemplary embodiment, the first secure partition area 347*b* may correspond to a first fingerprint, and the second secure partition area 347*c* may correspond to a second fingerprint different from the first fingerprint. For example, the external host device may access the first secure partition area 347*b* only through the first fingerprint, and may access the second secure partition area 347*c* only through the second fingerprint.

Although FIG. 15B illustrates two secure partition areas, embodiments are not limited thereto. In addition, although FIG. 15B illustrates that the first fingerprint is a fingerprint of an index finger of the user and the second fingerprint is a fingerprint of a middle finger of the user, embodiments are not limited thereto. For example, each of the first and second fingerprints may be one of fingerprints of a thumb, an index finger, a middle finger, a ring finger and a little finger, or the first and second fingerprints may be fingerprints of different users or of different hands and/or feet of the same user.

In an alternate embodiment, two different fingerprints may be required to access a doubly-secured area. In another alternate embodiment, at least two of a plurality of fingerprints may be required to access any area. Although FIGS. 15A and 15B illustrate that the public area and the secure partition area are included in one nonvolatile memory, embodiments are not limited thereto, and the public area and the secure partition area may be included in different nonvolatile memories.

Figure 16:
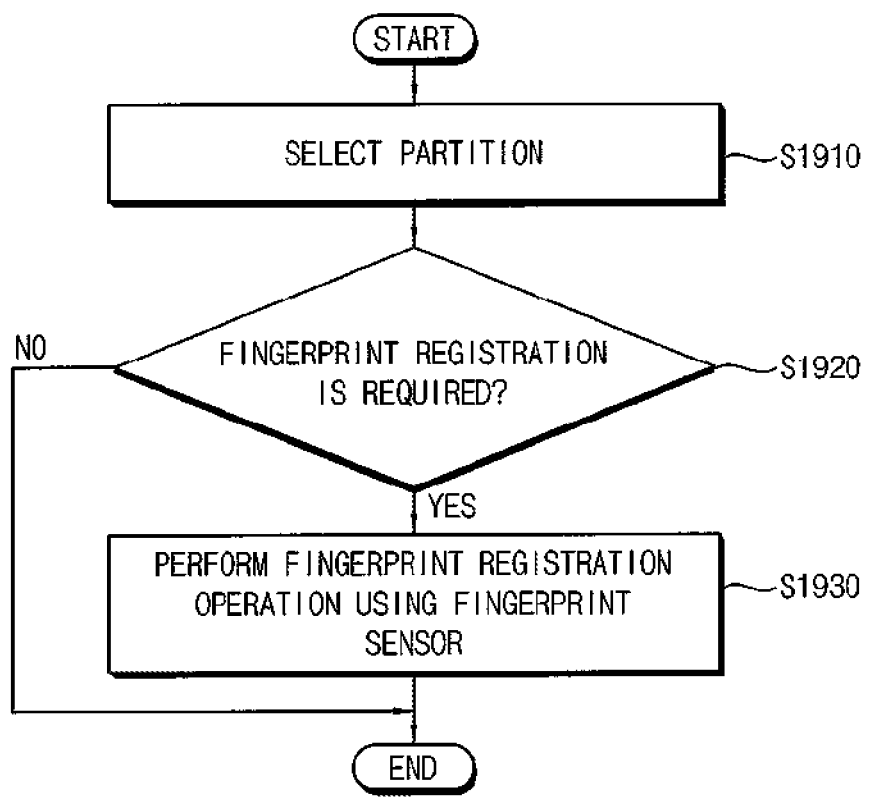
FIG. 16 is a flowchart diagram illustrating a fingerprint registration process performed by a storage device according to an exemplary embodiment.

FIG. 16 illustrates a fingerprint registration process performed by a storage device according to an exemplary embodiment. Duplicate description with respect to FIG. 13 may be omitted.

Referring to FIGS. 3 and 16, when performing a fingerprint registration process, one of a plurality of partitions included in the storage device 300 may be selected at step S1910, and steps S1920 and S1930 may be performed for the selected partition. Steps S1920 and S1930 of FIG. 16 may be substantially the same as steps S610 and S620 of FIG. 13, respectively. After the fingerprint registration process of FIG. 16 is completed for at least one secure partition area, the method of operating the storage device according to an exemplary embodiment described with reference to FIG. 14 may be performed.

As will be appreciated by those of ordinary skill in pertinent the art, the inventive concept may be embodied as a system, method, computer program product, and/or a computer program product embodied in one or more computer readable medium(s) having computer readable program code embodied thereon. The computer readable program code may be provided to a processor of a general-purpose computer, special purpose computer, or other programmable data processing apparatus. The computer readable medium may be a non-transitory computer readable signal medium or a tangible computer readable storage medium. The computer readable storage medium may be any tangible medium that can contain or store a program for use by or in connection with an instruction execution system, apparatus, or device. For example, the computer readable medium may be a non-transitory computer readable medium. The term "non-transitory" as used herein is a limitation on the medium itself, which is tangible such as a flash memory, a dynamic random-access memory (DRAM), or the like, rather than a mere signal. The "non-transitory" limitation shall not invoke a limitation on data storage persistency, per se.

Figure 17:
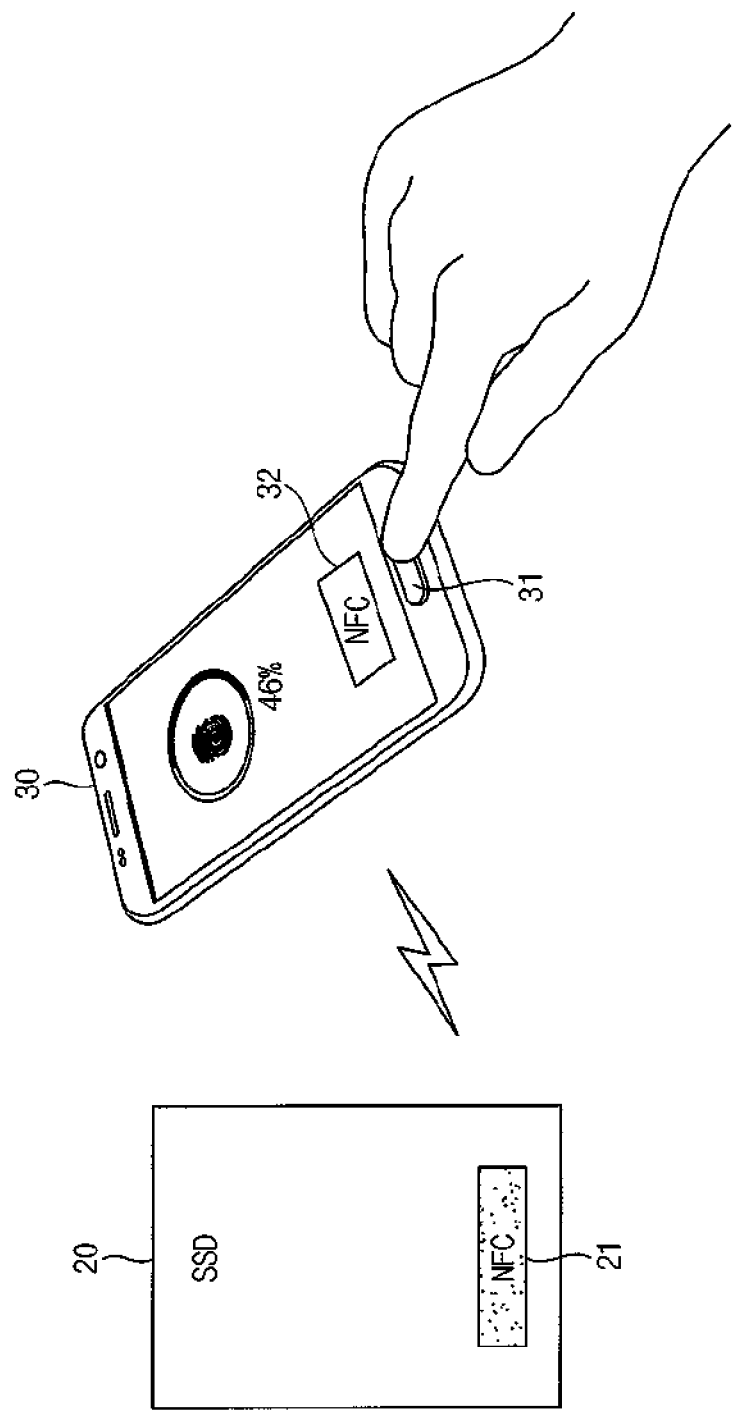
FIG. 17 is a conceptual diagram for conceptually describing a storage system according to an exemplary embodiment.

FIG. 17 illustrates a storage system according to an exemplary embodiment. Referring to FIG. 17, a storage system includes a storage device 20 and a mobile device 30.

The storage device 20 may perform wireless communication with the mobile device 30. For example, a wireless communication function may be near field communication (NFC), and the storage device 20 may include an NFC module 21.

The mobile device 30 may sense, register and recognize a fingerprint of a user, and may perform wireless communication with the storage device 20. For example, the mobile device 30 may include a fingerprint sensor 31 and an NFC module 32.

In an exemplary embodiment, the mobile device 30 may sense and check the fingerprint of the user. When the fingerprint of the user is successfully recognized, the mobile device 30 may generate a token corresponding to fingerprint recognition success, and may transmit the generated token to the storage device 20 through the wireless communication. The storage device 20 may receive the token transmitted from the mobile device 30, and may allow the external host device to access the storage device 20. For example, the token may include a valid time.

In alternate embodiments, the mobile device 30 may transmit only sensed fingerprint information to the storage device 20. To perform fingerprint authentication, the user may allow the mobile device 30 to approach the storage device 20 while his/her finger is placed on the fingerprint sensor 31 of the mobile device 30. In this case, fingerprint information sensed in the mobile device 30 may be transmitted to the storage device 20 through the NFC modules 32 and 21. For example, the transmitted fingerprint information may be information coded based on a hash algorithm. The storage device 20 may release a fingerprint recognition lock during a given time based on the transmitted fingerprint information, and the external host device may then access the storage device 20. In contrast, in the case where the user does not perform a successful fingerprint recognition, the external host device may be prevented from accessing the storage device 20 in a fingerprint recognition lock mode.

Figure 18:
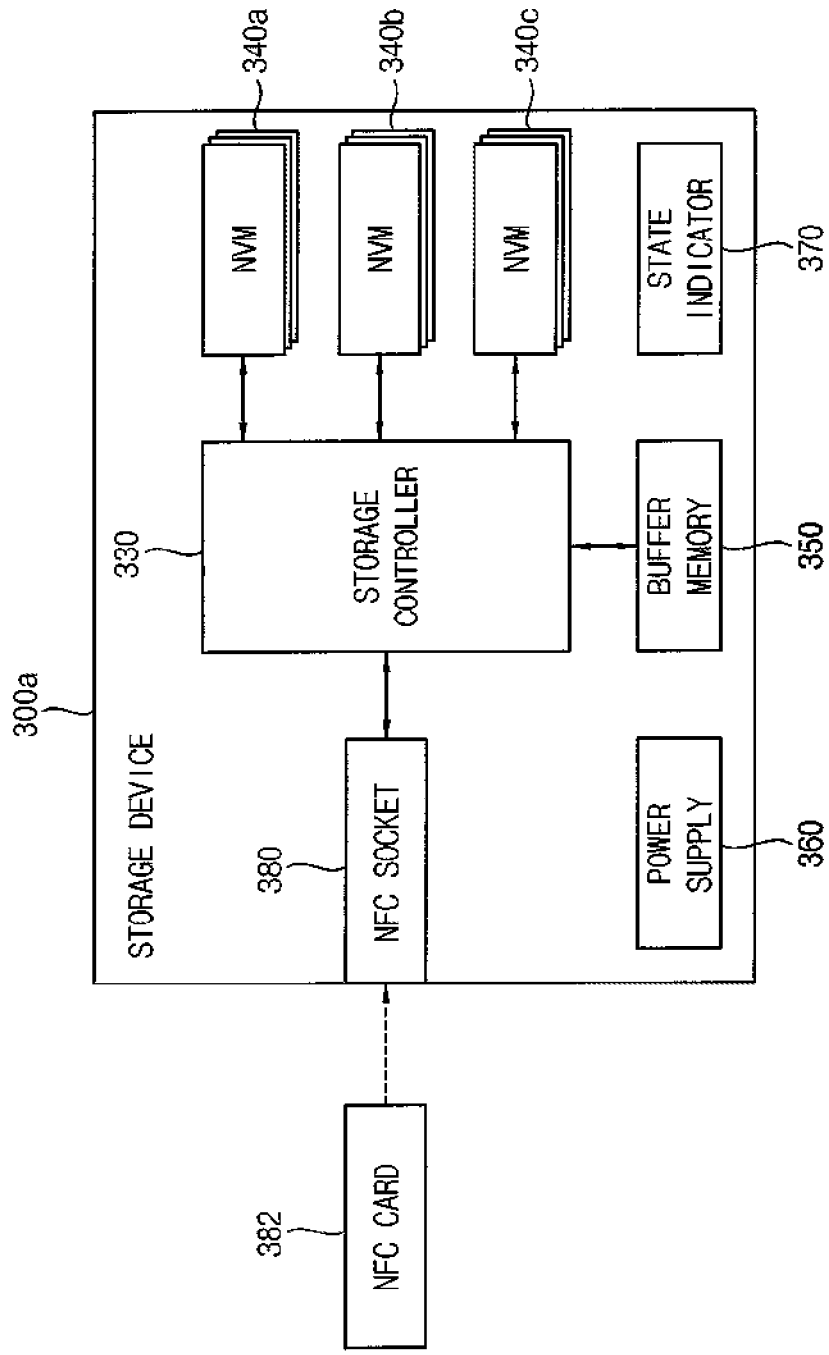
FIG. 18 is a schematic block diagram illustrating a storage device according to an exemplary embodiment.

FIG. 18 illustrates a storage device according to an exemplary embodiment. Referring to FIG. 18, a storage device 300*a* may be substantially the same as the storage device 300 in FIG. 3, except that the fingerprint sensor 310 and the fingerprint recognition controller 320 in FIG. 3 are omitted and an NFC socket 380 and an NFC card 382 are added to the storage device 300*a*. Duplicate description may be omitted.

The NFC socket 380 may be implemented to accommodate or insert the NFC card 382. The NFC socket 380 and the NFC card 382 may correspond to the NFC module 21 in FIG. 17, and the storage device 300*a* may perform wireless communication with the mobile device 30 in FIG. 17 through the NFC socket 380 and the NFC card 382. A process in which the host device, such as the host device 200 of FIG. 3, accesses the storage device 300*a* may be performed as follows:

The host device 200 may issue an access request to the storage device 300a. For example, the access request may be a read request or a write request. The storage device 300a may transmit a request for authenticating a user to the mobile device 30 in response to the access request of the host device 200. The mobile device 30 may perform a fingerprint authentication operation on the user in response to the authentication request of the storage device 300a. The mobile device 30 may sense a fingerprint of a user, may compare a registered fingerprint with the sensed fingerprint, and may generate a token corresponding to the comparison result. The mobile device 30 may transmit a token corresponding to authentication success to the storage device 300a. The storage device 300a may receive the token transmitted from the mobile device 30, and may provide the host device 200 with drive information of the storage device 300a. The host device 200a may display drives of the storage device 300a by using the drive information received from the storage device 300a. In other words, the host device 200 may access a drive of the storage device 300a when the registered fingerprint is recognized. As described with reference to FIGS. 1 through 16, the initialization operation, such as the operation of transmitting the drive information, and the fingerprint recognition preparation operation, may be performed substantially simultaneously or concurrently performed in parallel, and the initialization operation may be started before the fingerprint recognition operation is completed.

Figure 19:
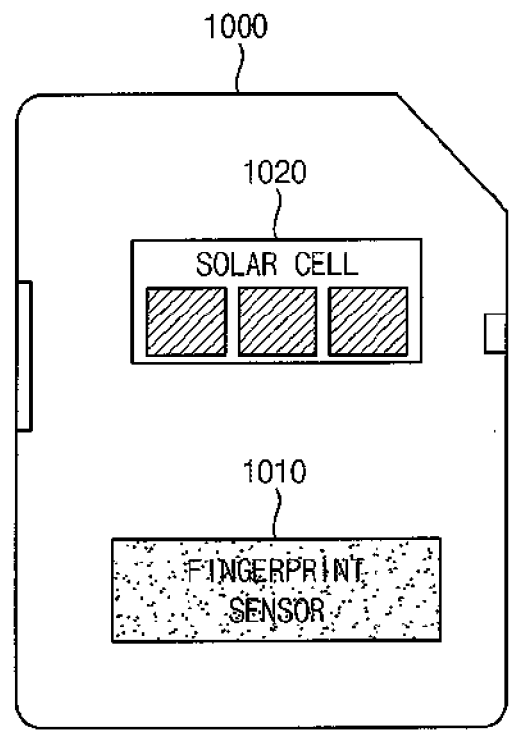
FIG. 19 is a conceptual block diagram illustrating a memory card including a storage device according to an exemplary embodiment.

FIG. 19 illustrates a memory card including a storage device according to an exemplary embodiment. Referring to FIG. 19, a memory card 1000 may include a fingerprint sensor 1010 and at least one solar cell 1020.

The solar cell 1020 may receive light and may generate power for enabling or activating the fingerprint sensor 1010 by using the received light. Although not illustrated in FIG. 19, the memory card 1000 may include a nonvolatile memory and a memory controller to control the nonvolatile memory. The memory card 1000 may be implemented to be the same as the storage device 300 in FIG. 3, except that the solar cell 1020 is added to the memory card 1000 to supply power to the device.

Figure 20:
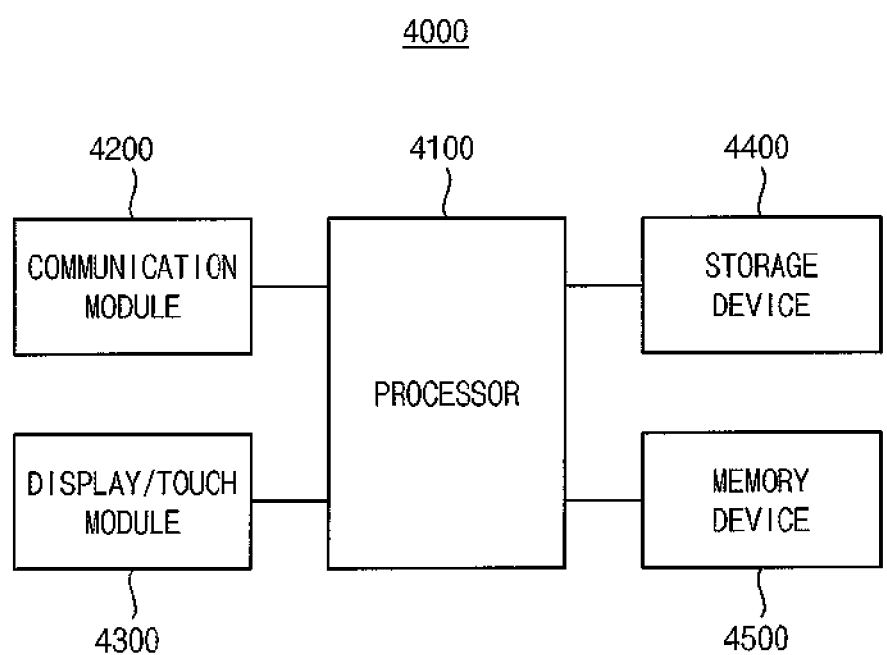
FIG. 20 is a schematic block diagram illustrating an electronic system according to an exemplary embodiment.

FIG. 20 illustrates an electronic system according to an exemplary embodiment. Referring to FIG. 20, an electronic system 4000 includes at least one processor 4100, a communication module 4200 in signal communication with the processor, a display/touch module 4300 in signal communication with the processor, a storage device 4400 in signal communication with the processor, and a memory device 4500 in signal communication with the processor. For example, the electronic system 4000 may be any mobile system or any computing system.

The processor 4100 controls operations of the electronic system 4000. The processor 4100 may execute an operating system and at least one application to provide an internet browser, games, videos, user content or the like. The communication module 4200 performs wireless or wired communications with an external system. The display/touch module 4300 displays data processed by the processor 4100 and/or receives data through a touch panel. The storage device 4400 stores user data, and operates based on the method according to an exemplary embodiment. The memory device 4500 temporarily stores data used for processing operations of the electronic system 4000. The processor 4100 and the storage device 4400 may correspond to the host device 200 and the storage device 300 of FIG. 3, respectively.

The inventive concept may be applied to various electronic devices and electronic systems including the exemplary storage device and the exemplary storage system. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, or the like.

The foregoing is illustrative of exemplary embodiments and is not to be construed as limiting thereof. Although some exemplary embodiments have been described, those of ordinary skill in the pertinent art will readily appreciate that many modifications are possible in the exemplary embodiments without materially departing from the novel teachings of the present disclosure. Accordingly, all such modifications are intended to be included within the scope of the present disclosure as defined in the following claims. Therefore, it is to be understood that the foregoing is illustrative of various embodiments and is not to be construed as limited to the specific exemplary embodiments disclosed, and that modifications to the disclosed exemplary embodiments, as well as other embodiments, are intended to be included within the scope and spirit of the appended claims and their equivalents.

What is claimed is:

1. A method of operating a storage device having biometric security protection, the method comprising:
    simultaneously starting both a storage device initialization operation and a biometric recognition operation; and
    if the storage device initialization operation has completed and the biometric recognition operation has successfully completed, setting the storage device to a normal access mode permitting external access to the storage device in accordance with the biometric security protection,
    wherein the storage device initialization operation and the biometric recognition operation are performed concurrently,
    wherein when the biometric recognition operation has completed, but the storage device initialization operation has not completed, waiting for completion of the storage device initialization operation,
    wherein when the storage device initialization operation has completed, but the biometric recognition operation has not completed, waiting for completion of the biometric recognition operation,
    wherein performing the biometric recognition operation includes, if a number of times that the biometric recognition operation is unsuccessful exceeds a predetermined number of times, deleting at least one predetermined file among files stored in the storage device,
    wherein the storage device variably operates in one of a secure mode and an insecure mode based on the biometric recognition operation.

2. The method of claim 1, performing the storage device initialization operation comprising:
    setting the storage device to a standby mode;
    turning on and initializing a storage controller included in the storage device;

initializing at least one nonvolatile memory included in the storage device;
providing predetermined information externally such that the storage device is externally recognizable; and
if the storage device is externally recognized, enabling a drive or a partition corresponding to the storage device to enter the standby mode,
wherein the storage device initialization operation is started before the biometric recognition operation is completed.

3. The method of claim 2, wherein, if the storage device is externally recognized when the storage device is in the standby mode before the biometric recognition operation is successfully completed, files stored in the storage device are not displayed.

4. The method of claim 2, wherein, if the storage device is externally recognized when the storage device is in the standby mode before the biometric recognition operation is successfully completed, only a predetermined file among files stored in the storage device is displayed.

5. The method of claim 1, performing the biometric recognition operation comprising:
performing a biometric preparation operation including enabling a biometric sensor;
comparing biometric indicia sensed by the biometric sensor with registered biometric indicia from the storage device;
if the biometric indicia sensed by the biometric sensor matches the registered biometric indicia, determining that the biometric recognition operation has successfully completed; and
if the biometric indicia sensed by the biometric sensor does not match the registered biometric indicia, determining that the biometric recognition operation is unsuccessful.

6. The method of claim 5, wherein:
the biometric sensor is included in the storage device.

7. The method of claim 1, further comprising:
receiving power on the storage device, wherein the simultaneous starting of both the storage device initialization operation and the biometric recognition operation is commenced immediately upon receiving power;
when the storage device initialization operation is completed and when the biometric recognition operation is not successfully completed, waiting for successful completion of the biometric recognition operation.

8. The method of claim 1, further comprising:
when the biometric recognition operation is successfully completed, and when the storage device initialization operation has not completed, waiting for completion of the storage device initialization operation.

9. The method of claim 1, wherein, if the storage device is externally recognized after the storage device is set to the normal access mode, files stored in the storage device are normally displayed.

10. The method of claim 1, wherein:
the storage device includes a secure partition area externally accessible in the secure mode but not in the non-secure mode, and a public partition area externally accessible in at least the non-secure mode.

11. The method of claim 10, wherein:
in the secure mode, the storage device performs the storage device initialization operation, is set to a standby mode if the storage device initialization operation has completed, performs the biometric recognition operation, and is set to the normal access mode after the operation of setting the storage device to the standby mode is completed and the biometric recognition operation is successfully completed, and
in the secure mode, the secure partition area is externally accessible after the storage device is set to the normal access mode.

12. The method of claim 10, wherein:
in the non-secure mode, the storage device performs the storage device initialization operation and is set to the normal access mode, and
in the non-secure mode, the public partition area of the storage device is externally accessible regardless of completing the biometric recognition operation.

13. The method of claim 10, wherein the secure partition area includes:
a first secure partition area corresponding to first biometric indicia; and
a second secure partition area corresponding to second biometric indicia different from the first biometric indicia.

14. The method of claim 1, further comprising:
performing a biometric preparation operation including enabling a biometric sensor; and
if the storage device holds no user data, performing a biometric indicia registration operation for registering biometric indicia of a user sensed by the biometric sensor,
wherein the biometric sensor is a fingerprint sensor embedded in the storage device.

15. A storage device having biometric security protection, the storage device comprising:
a plurality of nonvolatile memories;
a storage controller configured to control operations of the plurality of nonvolatile memories;
a power supply configured to supply power to the plurality of nonvolatile memories and the storage controller; and
at least one biometric sensor configured to sense biometric indicia of a user,
wherein, immediately after the power is supplied to the storage device, the storage controller is configured to set the storage device to a standby mode by starting a storage device initialization operation on the storage device,
wherein the storage controller is configured to perform a biometric recognition operation for recognizing the biometric indicia of the user by performing a biometric preparation operation using the at least one biometric sensor,
wherein, when the storage device initialization operation is completed and an operation of setting the storage device to the standby mode is completed, and when the biometric recognition operation is successfully completed, the storage controller is configured to set the storage device to a normal access mode such that an external host device is allowed to access the storage device in accordance with the biometric security protection,
wherein the storage device initialization operation and the biometric recognition operation are concurrently performed, and the storage device initialization operation is started before the biometric recognition operation is completed,
wherein when the biometric recognition operation has completed, but the storage device initialization operation has not completed, waiting for completion of the storage device initialization operation, wherein when the storage device initialization operation has completed, but the biometric recognition operation has not completed, waiting for completion of the biometric recognition operation, wherein performing the biometric recognition operation includes, if a number of times that the biometric recognition operation is unsuccessful exceeds a predetermined number of times, deleting at least one predetermined file among files stored in the storage device, wherein the storage device variably operates in one of a secure sub-mode and an insecure sub-mode based on the biometric recognition operation.

16. The storage device of claim 15, further comprising:
a biometric recognition controller configured to control the at least one biometric sensor, to register the biometric indicia of the user, and to compare biometric indicia sensed by the at least one biometric sensor with registered biometric indicia.

17. The storage device of claim 15, further comprising:
a state indicator configured to display a result of the biometric recognition operation.

18. The storage device of claim 15, wherein the at least one biometric sensor is enabled when the storage device operates in a secure mode.

19. The storage device of claim 15, wherein the storage device is one of a portable solid-state drive (SSD), universal flash storage (UFS) and embedded multi-media card (eMMC), and the at least one biometric sensor is a plurality of fingerprint sensors.

20. A method of operating a storage device having biometric security protection, the method comprising:
supplying power to the storage device by electrically connecting the storage device with an external host device;
immediately after power is supplied to the storage device, setting the storage device to a standby mode in which all or part of files stored in the storage device are not displayed by turning on and initializing a storage controller and a plurality of nonvolatile memories included in the storage device, by exchanging predetermined information with the external host device such that the storage device is recognized by the external host device, and by enabling a drive and a partition corresponding to the storage device;
performing a fingerprint preparation operation;
performing a fingerprint recognition operation for recognizing a fingerprint of a user by comparing a fingerprint sensed by a fingerprint sensor with a registered fingerprint;
when an operation of setting the storage device to the standby mode is completed, and when the fingerprint sensed by the fingerprint sensor matches the registered fingerprint and the fingerprint recognition operation is successfully completed, setting the storage device to a normal access mode such that the external host device is allowed to access the storage device in accordance with the biometric security protection;
when the operation of setting the storage device to the standby mode is not completed, but the fingerprint recognition operation is successfully completed, waiting for a completion of the operation of setting the storage device to the standby mode;
when the fingerprint recognition operation is not successfully completed, but the operation of setting the storage device to the standby mode is completed, waiting for a successful completion of the fingerprint recognition operation; and
when the fingerprint sensed by the fingerprint sensor does not match the registered fingerprint and the fingerprint recognition operation is unsuccessful, and when a number of times that the fingerprint recognition operation is unsuccessful exceeds a predetermined number of times, deleting a predetermined file among the files stored in the storage device,
wherein the operation of setting the storage device to the standby mode and the fingerprint recognition operation are simultaneously or concurrently performed in parallel, and the operation of setting the storage device to the standby mode is started before the fingerprint recognition operation is completed,
wherein performing the fingerprint recognition operation includes, if a number of times that the fingerprint recognition operation is unsuccessful exceeds a predetermined number of times, deleting at least one predetermined file among files stored in the storage device,
wherein the storage device variably operates in one of a secure sub-mode and an insecure sub-mode based on the fingerprint recognition operation.

* * * * *